(12) United States Patent
Hayaishi

(10) Patent No.: US 7,612,824 B2
(45) Date of Patent: Nov. 3, 2009

(54) IMAGE-QUALITY ADJUSTMENT OF IMAGE DATA

(75) Inventor: Ikuo Hayaishi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 689 days.

(21) Appl. No.: 10/515,948

(22) PCT Filed: Jul. 18, 2003

(86) PCT No.: PCT/JP03/09217

§ 371 (c)(1),
(2), (4) Date: Jul. 26, 2005

(87) PCT Pub. No.: WO2004/010693

PCT Pub. Date: Jan. 29, 2004

(65) Prior Publication Data

US 2005/0275730 A1 Dec. 15, 2005

(30) Foreign Application Priority Data

Jul. 19, 2002 (JP) ............................. 2002-210464

(51) Int. Cl.
*H04N 5/222* (2006.01)
*H04N 5/235* (2006.01)
(52) U.S. Cl. ..................................... 348/370; 348/222.1
(58) Field of Classification Search ............. 348/222.1, 348/223.1, 225.1, 224.1, 362, 207.99
See application file for complete search history.

(56) References Cited

U.S. PATENT DOCUMENTS

| | | | |
|---|---|---|---|
| 5,194,960 A | 3/1993 | Ota | |
| 5,739,924 A | 4/1998 | Sano | |
| 6,359,651 B1 * | 3/2002 | Yokonuma | ................... 348/370 |
| 6,825,884 B1 * | 11/2004 | Horiuchi | ..................... 348/362 |
| 7,098,944 B1 * | 8/2006 | Shiraiwa et al. | .......... 348/222.1 |
| 7,355,648 B1 * | 4/2008 | Braun et al. | ................ 348/370 |
| 2003/0133021 A1 * | 7/2003 | Hamamura et al. | ...... 348/229.1 |
| 2003/0179312 A1 * | 9/2003 | Tseng | ......................... 348/371 |
| 2003/0215220 A1 | 11/2003 | Ohmura et al. | |

FOREIGN PATENT DOCUMENTS

JP 04-168879 6/1992

(Continued)

OTHER PUBLICATIONS

Abstract of Japanese Patent Publication No. 2000-305141, Pub. Date: Nov. 2, 2000, Patent Abstracts of Japan.

(Continued)

*Primary Examiner*—Nhan T Tran
*Assistant Examiner*—Amy Hsu
(74) *Attorney, Agent, or Firm*—Martine Penilla & Gencarella, LLP

(57) ABSTRACT

An image quality adjuster adjusts luminance values of image data sing the image data generated by an image generating device, and image generation record information associated with the image data containing at least light emission information for a supplemental light source flash at the time of generation of the image data. Specifically, a decision is made based on the light emission information for the supplemental light source as to whether to execute an image quality adjustment process; and if a decision to do so, the image data is adjusted so as to reduce the maximum luminance value, which is the largest possible luminance value the image data may have.

3 Claims, 19 Drawing Sheets

FOREIGN PATENT DOCUMENTS

| | | |
|---|---|---|
| JP | 10-191246 | 7/1998 |
| JP | 11-127415 | 5/1999 |
| JP | 11-195115 | 7/1999 |
| JP | 2000-175207 | 6/2000 |
| JP | 2000-305141 | 11/2000 |
| JP | 2001-126075 | 5/2001 |
| JP | 2001-243463 | 9/2001 |
| JP | 2001-339636 | 12/2001 |
| JP | 2002-092607 | 3/2002 |
| JP | 2002-158892 | 5/2002 |
| JP | 2002-369075 | 12/2002 |
| JP | 2003-111005 | 4/2003 |
| JP | 2003-169231 | 6/2003 |

OTHER PUBLICATIONS

Abstract of Japanese Patent Publication No. JP 04-168879, Pub. Date: Jun. 17, 1992, Patent Abstracts of Japan.

Abstract of Japanese Patent Publication No. JP 2001-126075, Pub. Date: May 11, 2001, Patent Abstracts of Japan.

Abstract of Japanese Patent Publication No. JP 2002-092607, Pub. Date: Mar. 29, 2002, Patent Abstracts of Japan.

Abstract of Japanese Patent Publication No. JP 2002-369075, Pub. Date: Dec. 20, 2002, Patent Abstracts of Japan.

Abstract of Japanese Patent Publication No. 2003-169231, Pub. Date: Jun. 13, 2003, Patent Abstracts of Japan.

Abstract of Japanese Patent Publication No. JP 10-191246, Pub. Date: Jul. 21, 1998, Patent Abstracts of Japan.

Abstract of Japanese Patent Publication No. JP 11-127415, Pub. Date: May 11, 1999, Patent Abstracts of Japan.

Abstract of Japanese Patent Publication No. JP 11-195115, Pub. Date: Jul. 21, 1999, Patent Abstracts of Japan.

Abstract of Japanese Patent Publication No. JP 2000-175207, Pub. Date: Jun. 23, 2000, Patent Abstracts of Japan.

Abstract of Japanese Patent Publication No. 2001-243463, Pub. Date: Sep. 7, 2001, Patent Abstracts of Japan.

Abstract of Japanese Patent Publication No. 2001-339636, Pub. Date: Dec. 7, 2001, Patent Abstracts of Japan.

Abstract of Japanese Patent Publication No. JP 2002-158892, Pub. Date: May 31, 2002, Patent Abstracts of Japan.

Abstract of Japanese Patent Publication No. JP 2003-111005, Pub. Date: Apr. 11, 2003, Patent Abstracts of Japan.

* cited by examiner

| Tag name | Parameter value |
|---|---|
| Flash | ・Auto flash mode<br>・Flash<br>・Reflected light sensor present<br>・Reflected light sensed |
| Subject distance | 1 (m) |
| Flash intensity | 1000(BCPS) |
| Aperture value | F8 |
| ISO speed rating | 100 |

●
●
●
●
●

IMAGE-QUALITY ADJUSTMENT OF IMAGE DATA

TECHNICAL FIELD

The present invention relates to an image adjustment technique for making adjustments to image quality of image data.

BACKGROUND ART

Image quality of image data generated by a digital still camera (DSC), digital video camera (DVC) or the like can be adjusted as desired using an image retouching application on a personal computer. An image retouching application is typically provided with an image adjusting function for automatically adjusting image quality of image data; by using this image adjusting function, the quality of an image output by an output device can be improved. CRTs, LCDs, printers, projectors, and television receivers, for example, are known as output devices for images.

A printer driver, which controls the operation of one of these output devices, namely, a printer, is also equipped with a function for automatically adjusting image quality; image quality of printed images can be improved using such a printer driver as well.

However, in the automatic image quality adjusting function provided by an image retouching application or printer driver, image quality correction is executed based on image data having typical image characteristics. On the other hand, since the image data being subjected to image processing can be produced under various conditions, in some instances, image quality cannot be improved by executing a given automatic image quality adjusting function.

For example, where a physical object, landscape, person, video image or other photographic subject appears dark, a method of producing a flash or other supplemental light source in order to illuminate the subject is frequently employed. If the quantity of light falling on the subject from the supplemental light source is greater than the proper amount, so-called "whiteout" areas of high luminance and whitish appearance may occur in portions of the image obtained from the image data so produced. These whiteout areas have high luminance and tend to stand out relative to other areas; however, it has not been intended that these whiteout areas should stand out. When an image containing such a whiteout area is subjected to image quality correction based on image data having typical image characteristics, overall image quality cannot be improved in some instances. This problem is not limited to DSCs, and is a problem common to DVCs and other such image generating devices.

In view of the problems mentioned above, it is an object of the invention to automatically carry out image quality adjustments appropriate for individual sets of image data.

DISCLOSURE OF THE INVENTION

In order to achieve the aforementioned object at least in part, an image processing device according to the present invention is a device for performing image processing using image data generated by an image generation device, and image generation record information associated with the image data that include light emission information of a supplemental light source at the time of generation of the image data. The image processing device comprises: an image quality adjuster configured to decide, based on the light emission information for the supplemental light source included in the image generation record information, whether to execute an image quality adjustment process, wherein if a positive decision is made, the image quality adjuster executes the image quality adjustment process to adjust the image data so as to reduce a maximum luminance value which is a largest possible luminance value the image data may have.

The image processing device according to the invention can, on the basis of the light emission information for the supplemental light source at the time of generation of the image data, make an appropriate decision as to whether to execute image quality adjustment. Since image quality adjustment is executed so as reduce the maximum luminance value, which represents the largest possible luminance value the image data may take, the tendency for areas of high luminance to stand out can be inhibited.

Preferably, the image quality adjuster decides, based on the light emission information of the supplementary light source included in the image generation record information, whether illumination was provided by the supplemental light source at the time of generation of the image data, and the image quality adjuster executes the image quality adjustment process if a judgment is made that (a) illumination was provided by the supplemental light source at the time of generation of the image data.

In this arrangement, the tendency for areas of high luminance to stand out when illuminated can be inhibited.

Also preferably, the image generation record information further includes information relating to a distance between a subject of the image data and the image generation device of the image data at the time of generation of the image data, and the image quality adjuster halts execution of the image quality adjustment process, or reduces a magnitude of luminance value adjustment in the image quality adjustment process, irrespective of a positive or negative result of the judgment (a), if a judgment is made that (b) the distance from the subject is not within a first predetermined near distance range.

In this arrangement, the decision as to whether image quality adjustment is carried out can be made appropriately on the basis of distance from the subject at the time that image data is generated.

The image generation record information may further include information relating to quantity of light of the supplemental light source at the time of generation of the image data, and the image quality adjuster may adjust the first predetermined near distance range based on at least the quantity of light.

In this arrangement, the decision as to whether image quality adjustment is carried out can be made appropriately on the basis of the quantity of light of a supplemental light source at the time that image data is generated.

The image generation record information may further include information relating to an aperture value of the image generating device at the time of generation of the image data, and the image quality adjuster may adjust the first predetermined near distance range based on at least the aperture value.

In this arrangement, the decision as to whether image quality adjustment is carried out can be made appropriately on the basis of the aperture value of the image generating device at the time that image data is generated.

The image generation record information may further include information relating to sensitivity of an optical circuit of the image generating device at the time of generation of the image data, and the image quality adjuster may adjust the first predetermined near distance range based on at least the optical circuit sensitivity.

In this arrangement, the decision as to whether image quality adjustment is carried out can be made appropriately on the basis of the sensitivity of the optical circuit of the image generating device at the time that image data is generated.

The image generation record information may further includes information relating to quantity of light of the supplemental light source at the time of generation of the image data, and the image quality adjuster may halt execution of the image quality adjustment process, or reduce a magnitude of luminance value adjustment in the image quality adjustment process, irrespective of a positive or negative result of the judgment (a), if a judgment is made that (c) the quantity of light is not within a second predetermined range.

In this arrangement, the decision as to whether image quality adjustment is carried out can be made appropriately on the basis of the quantity of light of the supplemental light source at the time that image data is generated.

The image quality adjuster may halt execution of the image quality adjustment process, or reduce a magnitude of luminance value adjustment in the image quality adjustment process, irrespective of a positive or negative result of the judgment (a), if a judgment is made that (d) size of an area of interlinked pixels having luminance above a first predetermined luminance value in the image data is less than a predetermined threshold value.

In this arrangement, the decision as to whether image quality adjustment is carried out can be made appropriately, on the basis of the size of an area of interlinked pixels having luminance above a first predetermined luminance value.

The image generation record information may further include information relating to quantity of light of the supplemental light source at the time of generation of the image data, and the image quality adjuster may adjust magnitude of luminance value adjustment in the image quality adjustment process based on at least the quantity of light.

In this arrangement, the magnitude of luminance value adjustment can be adjusted appropriately on the basis of the quantity of light of a supplemental light source.

The image generation record information may further include information relating to a distance between a subject of the image data and the image generating device at the time of generation of the image data, and the image quality adjuster may adjust magnitude of luminance value adjustment in the image quality adjustment process based on at least the distance from the subject.

In this arrangement, the magnitude of luminance value adjustment can be adjusted appropriately on the basis of the distance from a subject.

The image generation record information may further include information relating to an aperture value of the image generating device at the time of generation of the image data, and the image quality adjuster may adjust magnitude of luminance value adjustment in the image quality adjustment process based on at least the aperture value.

In this arrangement, the magnitude of luminance value adjustment can be adjusted appropriately on the basis of aperture value.

The image generation record information may further includes information relating to sensitivity of an optical circuit of the image generating device at the time of generation of the image data, and the image quality adjuster may adjust magnitude of luminance value adjustment in the image quality adjustment process based on at least the sensitivity.

In this arrangement, the magnitude of luminance value adjustment can be adjusted appropriately on the basis of optical circuit sensitivity.

The image processing device pertaining to another aspect of the invention is an image processing device for processing image data generated by an image generating device, comprising an image quality adjuster configured to execute an image quality adjustment process to adjust the image data so as to reduce a maximum luminance value which is a largest possible luminance value the image data may have, if a judgment is made that size of an area of interlinked pixels having luminance above a first predetermined luminance value in the image data is greater than a predetermined threshold value.

This image processing device can appropriately make a decision as to whether to execute image quality adjustment, on the basis of the size of an area of interlinked pixels having luminance above a first predetermined luminance value. Additionally, since it executes image quality adjustment so as to reduce the maximum luminance value which represents the largest possible luminance value, areas of high luminance can be prevented from standing out.

Preferably, a target area targeted for the image quality adjustment process includes a first type area of interlinked maximum luminance pixels having a largest possible luminance value.

In this arrangement, areas of interlinked maximum-luminance pixels can be prevented from standing out.

The target area targeted for the image quality adjustment process may further include a second type area meeting a specific condition, and situated in proximity to the first type area.

In this arrangement, the boundary between an area of interlinked maximum-luminance pixels and the surrounding area can be prevented from standing out.

The specific condition may include at least the condition (e) that the second type area is composed of pixels whose shortest distance from the first type area is equal to or less than a first predetermined distance.

In this arrangement, the boundary between an area of interlinked maximum-luminance pixels and the surrounding area can be prevented from standing out.

The specific condition may include at least the condition (f) that the second type area is composed of pixels whose luminance values are equal to or greater than a second predetermined luminance value, and is an area interlinked with the first type area.

In this arrangement, the boundary between an area of interlinked maximum-luminance pixels and a surrounding area composed of pixels whose luminance values are above a second predetermined luminance value can be prevented from standing out.

An output apparatus according to the present invention is an output apparatus for outputting an image using image data generated by an image generation device, and image generation record information associated with the image data that include light emission information of a supplemental light source at the time of generation of the image data. The output apparatus comprises: an image quality adjuster configured to decide, based on the light emission information for the supplemental light source included in the image generation record information, whether to execute an image quality adjustment process, wherein if a positive decision is made, the image quality adjuster executes the image quality adjustment process to adjust the image data so as to reduce a maximum luminance value which is a largest possible luminance value the image data may have. ; and an image output unit configured to output an image according to the quality-adjusted image data.

The invention may be realized in various embodiments, for example, an image output method and image output device; and image processing method and image processing device; a computer program for realizing the functions of such a method or device; and a storage medium having such a computer program stored thereon.

BRIEF DESCRIPTION OF THE DRAWINGS

FIG. 5 is an explanatory diagram describing an example of data structure in an Exif data field.

BEST MODE FOR CARRYING OUT THE INVENTION

Output image adjustment of image files according to the present invention is described hereinbelow through several embodiments, in the following order, with reference to the accompanying drawings.

Figure 1:
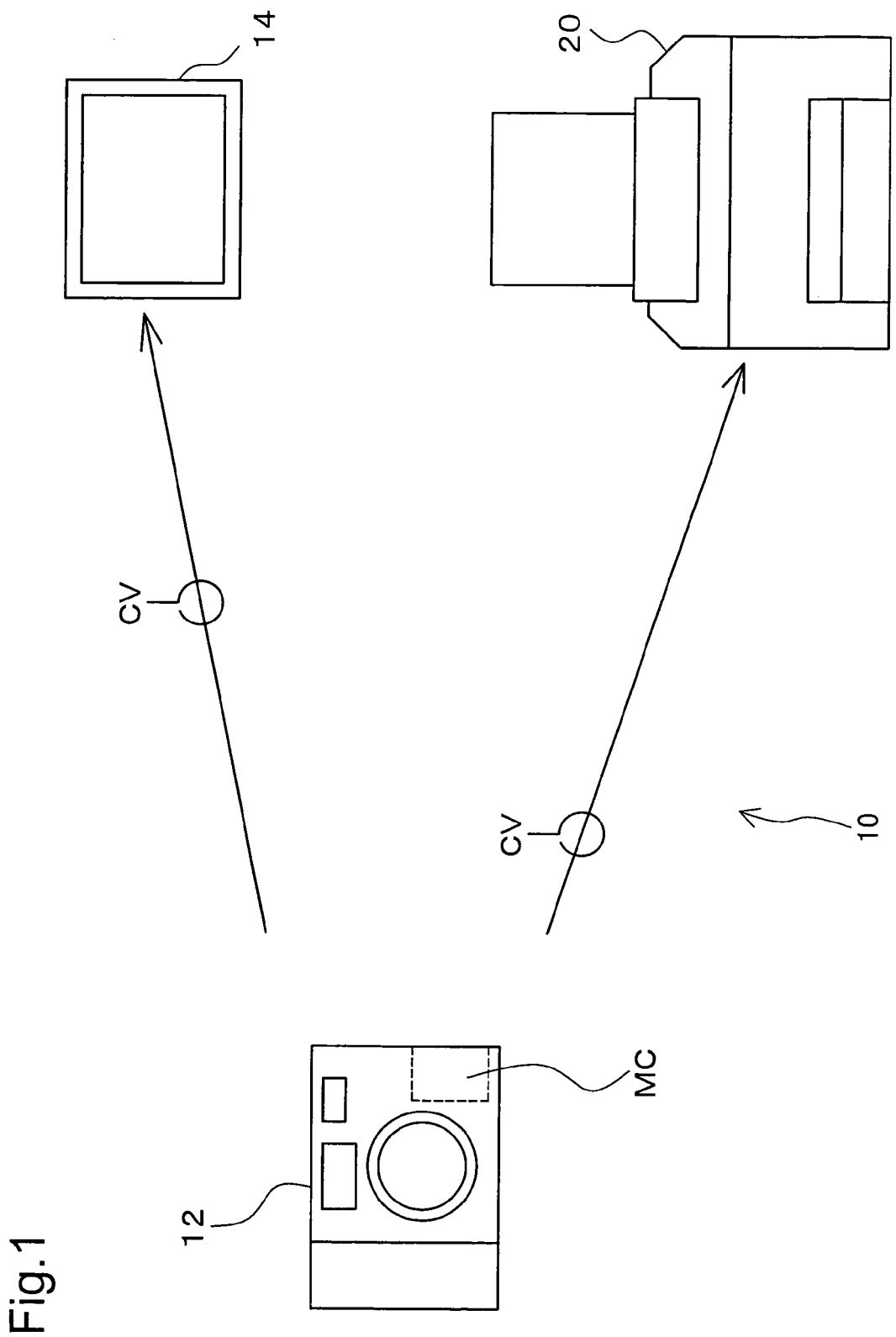
FIG. 1 is a block diagram showing the arrangement of an image output system as a embodiment of the invention.

A. Arrangement of Image Output System;
B. Arrangement of Image File;
C. Arrangement of Image Output System Capable of Using Image File;
D. Image Processing in Digital Still Camera;
E. Image Processing in Printer;
F. Embodiments of Automatic Image quality Adjustment Process;
G. Arrangement of Image Output System Employing Image Data Processing Device;
H. Variations A. Arrangement of Image Output System FIG. 1 illustrates an exemplary image output system in which an output device may be implemented as a embodiment of the invention. Image output system 10 comprises a digital still camera 12 as an image generating device for generating image files; and a printer 20 as an image output device. An image file generated by digital still camera 12 can be transferred to printer 20 via a cable CV, or by directly inserting into printer 20 a memory card MC on which the image file is stored. Printer 20 executes image quality adjustment processing of image data based on the image file that has been read in, and outputs an image. As the output device, a CRT display, LCD display, or other monitor 14, a projector, or the like could be used in addition to or instead of a printer 20. The following description is based on the use of a printer 20 comprising an image quality adjusting module and an image output module as the output device, with a memory card MC being inserted directly into the printer 20.

Figure 2:
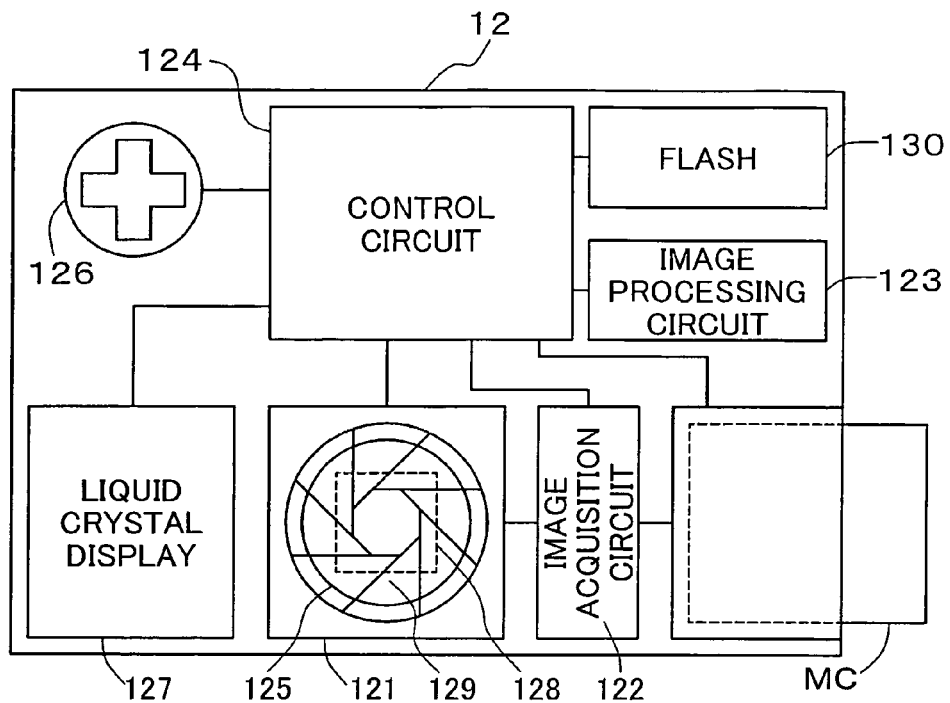
FIG. 2 is a block diagram showing a simplified arrangement of a digital still camera 12.

FIG. 2 is a block diagram showing a simplified arrangement of digital still camera 12. The digital still camera 12 of this embodiment comprises an optical circuit 121 for collecting optical information; an image acquisition circuit 122 for controlling the optical circuit to acquire an image; an image processing circuit 123 for processing the acquired digital image; a flash 130 serving as a supplemental light source; and a control circuit 124 for controlling the various circuits. Control circuit 124 comprises memory, not shown. Optical circuit 121 comprises a lens 125 for collecting optical information; an aperture 129 for adjusting the amount of light; and a CCD 128 for converting optical data passing through the lens into image data.

Digital still camera 12 stores the acquired image on a memory card MC. The typical storage format for image data in digital still camera 12 is the JPEG format, but other storage formats, such as TIFF format, GIF format, BMP format, or RAW data format could be used instead.

Digital still camera 12 comprises a Select/Set button 126 for setting various shooting parameters (aperture value, flash mode, ISO speed, shooting mode, etc.); and a liquid crystal display 127. Liquid crystal display 127 is used to preview a shot image, or when setting the aperture or other parameter using the Select/Set button 126.

Aperture value may be set to values within a range predetermined for each model of digital still camera 12; for example, it may be set to certain predetermined discrete numbers from 2 to 16 (e.g., 2, 2.8, 4, 5.6 . . . etc.). F number is typically used as the aperture value. Accordingly, a larger aperture value means a smaller aperture.

Flash mode is a parameter for controlling operation of the flash 130, and may be selected from among auto flash mode, flash off mode, forced flash mode, etc., for example.

ISO speed is a parameter that relates to the sensitivity of optical circuit 121. ISO speed may be set to values within a certain predetermined range, for example, predetermined discrete values from 100 to 800 (e.g., 100, 200, 400, 800 etc.). ISO speed is originally an indicator of sensitivity of silver salt film; it is used in combination with other parameters relating to image generation, such as aperture value, to set appropriate image generating parameters (shooting parameters). In a digital still camera, by using the corresponding ISO speed as an indicator of the sensitivity of the optical circuit, image generating parameters such as aperture value can be set easily.

Shooting mode may be selected from among a number of predetermined modes such as standard mode, portrait mode, landscape mode, night scene mode, etc. Where one of these shooting modes has been indicated, the relevant parameters (aperture value, ISO speed, flash mode, etc.) are set automatically depending on the set mode. For example, where standard mode has been selected as the shooting mode, parameters relating to image generation are set to standard values.

Once a shot has been taken by digital still camera 12, image data and image generation record information are stored in the form of an image file on memory card MC. Image generation record information can include aperture value and other parameter settings at the time of shooting (time of generation of image data), which will be described in detail hereinbelow.

B. Arrangement of Image File

Figure 3:
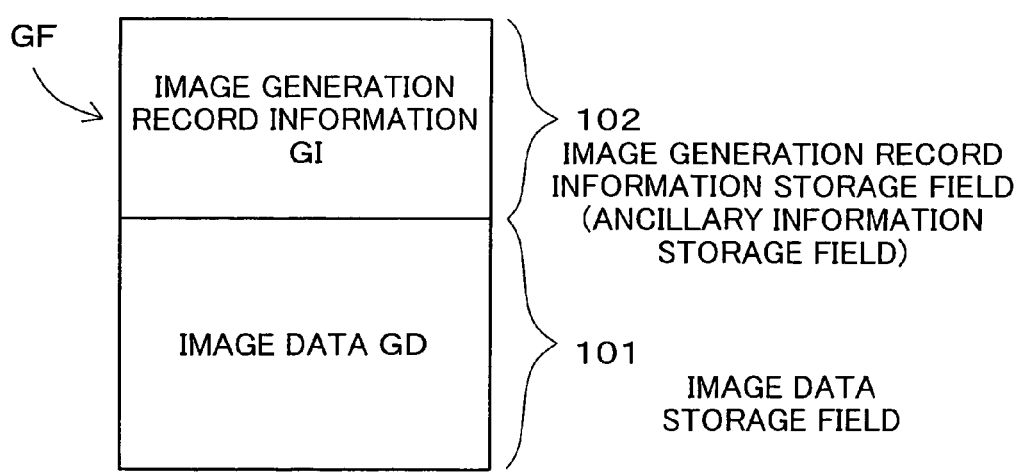
FIG. 3 is an explanatory diagram conceptually illustrating an example of an arrangement within an image file that can be used in this embodiment.

FIG. 3 is an explanatory diagram conceptually illustrating an example of an arrangement within an image file used in this embodiment. Image file GF comprises an image data storage field 101 for storing image data GD; and an image generation record information storage field 102 for storing image generation record information GI. Image data GD is stored, for example, in JPEG format, while image generation record information GI is stored, for example, in TIFF format (a format in which data and data fields are identified by tags). The terms "file structure" and "data structure" in this embodiment refer to the structure of the file or data in the form in which the file or data etc. is stored in a memory device.

Image generation record information GI is information relating to an image when image data is generated (shot) by digital still camera 12 or other such image generating device, and includes settings such as the following.

Flash (flash on/off)
Subject distance
Subject distance range
Flash intensity
Aperture value
ISO speed rating (ISO speed)
Shooting mode
Maker name
Model name
Gamma value The image file GF of this embodiment may basically comprise the aforementioned image data storage field 101 and image generation record information storage field 102; or may have a file structure according to an existing standardized file format. The following specific description pertains to the case where the image file GF pertaining to this embodiment conforms to the Exif file format.

An Exif file has a file structure in accordance with the digital still cameran image file format specification (Exif); the specification has been proposed by the Japan Electronics and Information Technology Industries Association (JEITA). Similar to the conceptual diagram in FIG. 3, the Exif file format comprises a JPEG image data storage field for storing image data in the JPEG format; and an ancillary information storage field for storing information of various kinds relating to the stored JPEG image data. The JPEG image data storage field corresponds to the image data storage field 101 in FIG. 3, and the ancillary information storage field to the image generation record information storage field 102. The ancillary information storage field stores image generation record information relating to a JPEG image, such as shooting date/time, aperture value, and subject distance.

Figure 4:
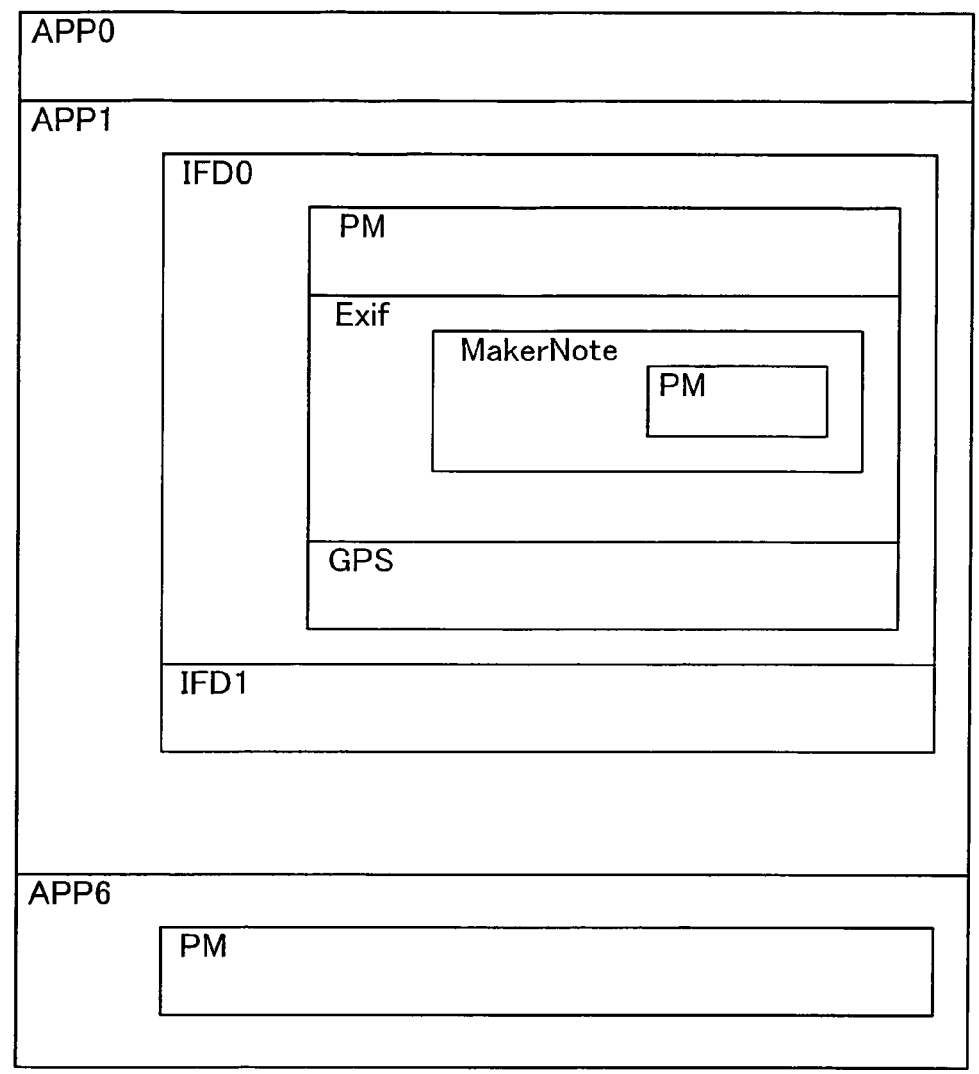
FIG. 4 is an explanatory diagram describing an example of data structure of an ancillary information storage field 103.

FIG. 4 is an explanatory diagram describing an example of data structure of ancillary information storage field 103. In the Exif file format, hierarchical tags are used to designate data fields. Each data field contains within it a plurality of subordinate data fields identified by subordinate tags. In FIG. 4, areas enclosed by rectangles represent single data fields, with tag names noted at upper left. In this embodiment, three data fields whose tag names are APP0, APP1, and APP6 are contained. The APP1 data field contains within it two data fields with the tag names IFD0 and IFD1. The IFD0 data field contains three data fields with the tag names PM, Exif, and GPS. Data and data fields are stored according to a prescribed address or offset value; address or offset value can be searched by means of tag name. On the output device end, data corresponding to desired information can be acquired by means of specifying and address or offset value corresponding to the desired information.

FIG. 5 is an explanatory diagram describing an example of data structure (data tag names and parameter values) in the Exif data field in FIG. 4, wherein tag name can be referenced by tracing in the order APP1-IFD0-Exif. As shown in FIG. 4, the Exif data field can include a data field with the tag name MakerNote; the MakerNote data field can in turn include a plurality of items of data, although these are omitted in FIG. 5.

As shown in FIG. 5, the Exif data field stores parameter values relating to information such as flash, subject distance, flash intensity, aperture value, ISO speed rating, and so on. In this embodiment, "flash" and "flash intensity" are used as light emission information relating to the quantity of light provided by a supplemental light source. Subject distance is used as information relating to the distance between a subject and the image generating device; aperture value is used as information relating to aperture value; and ISO speed rating is used as information relating to the sensitivity of the optical circuit. It is sufficient for flash information relating to the supplemental light source to contain at least information for use in deciding whether or not illumination was provided by the supplemental light source; for example, an arrangement in which only "flash" is used as light emission information for the supplemental light source is acceptable. Details of the decision as to whether or not illumination was provided by the supplemental light source will be described hereinbelow.

Flash information is information relating to flash operation, and may include four sets of information relating to operating mode and operation result thereof. Operating mode may be set from among a plurality of values including the following three values, for example.

1: Forced flash mode
2: Disable flash mode
3: Auto flash mode

Operation result may be set from among two values, Flash On or Flash Off, for example. The decision as to whether or not there was illumination by the supplemental light source during generation of image data may be carried out using this operation result.

Among image generating devices, certain devices are equipped with a mechanism for sensing reflected light from a subject illuminated with light from a flash. In the event that a flash cover or other obstacle blocks the flash light, or the flash fails to fire despite being operated, no illumination will have been provided. Such instances can be identified through the presence or absence of reflected light. Flash information can include information relating to the presence/absence of a reflected light sensing mechanism, and to the presence/absence of reflected light sensed at the time the image data is generated (time of shooting). In the event that a reflected light sensing mechanism is present and sensed reflected light is absent, it can be determined that no illumination was provided by the supplemental light source, even if the aforementioned operation result was Flash On.

Subject distance information is information relating to the distance between the image generating device and a subject. For example, it may be set in meter units, based on distance information set to match the focal point at the time that image data is generated.

Flash intensity is information relating to the quantity of light emitted by the flash at the time that image data is generated; the unit of measurement thereof is BCPS (Beam Candle Power Seconds), for example.

ISO speed rating information is information relating to the sensitivity of the optical circuit, and is set to a parameter value equivalent to ISO speed which is an index of sensitivity of silver salt film.

Information associated with image data may be also stored appropriately in fields other than the Exif data field in FIG. 4. For example, maker name and model name are stored in the data field whose tag name is IFD0, as information identifying the image generating device.

C. Arrangement of Image Output Device

Figure 6:
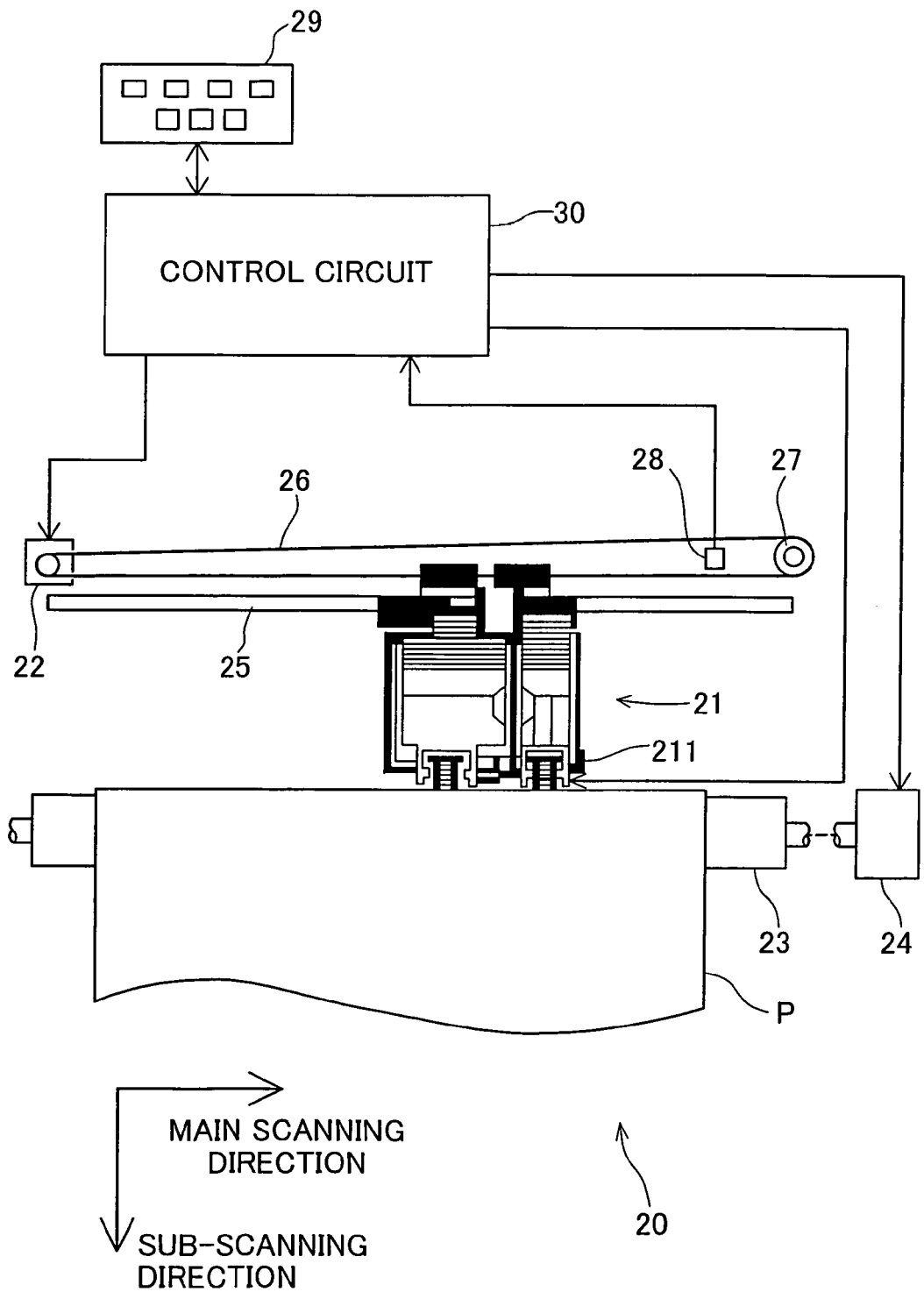
FIG. 6 is a block diagram showing a simplified arrangement of a printer 20.

FIG. 6 is a block diagram showing a simplified arrangement of printer 20 in the embodiment. Printer 20 is a printer capable of image output, for example, an ink jet printer that ejects ink of four colors, cyan C, magenta Mg, yellow Y, and black K, on a print medium to produce a dot pattern. An electro-photographic printer that transfers and fixes toner onto a print medium may also be used. In addition to the four colors indicated above, light cyan LC which is lighter in density than cyan C, light magenta LM which is lighter in density than magenta Mg, and dark yellow DY which is darker in density than yellow Y, may be used as inks. Where monochromatic printing is performed, the arrangement may employ black K only; or red R or green G may be used. The type of ink or toner used may be selected depending on the characteristics of the image for output.

As shown in the drawing, printer 20 comprises a mechanism for driving a print head 211 mounted on a carriage 21, to eject ink and form dots; a mechanism for reciprocating carriage 21 in the axial direction of a platen 23 by means of a carriage motor 22; a mechanism for feeding printer paper P by means of a paper feed motor 24; and a control circuit 30. By means of these mechanisms, printer 20 functions as an image output unit. The mechanism for reciprocating carriage 21 in the axial direction of a platen 23 is composed of a slide rail 25 extending parallel to the axis of platen 23, for slidably retaining carriage 21; a pulley 27 linked via an endless drive belt 26 to carriage motor 22; and a position sensor 28 for sensing the home position of carriage 21. The mechanism for feeding printer paper P is composed of platen 23; paper feed motor 24 which rotates platen 23; an auxiliary paper feed roller, not shown in the drawing; and a gear train (not shown) for transmitting rotation of paper feed motor 24 to platen 23 and the auxiliary paper feed roller.

Control circuit 30 exchanges signals with a printer control panel 29 while appropriately controlling operation of paper feed motor 24, carriage motor 22, and print head 211. Printer paper P supplied to printer 20 is set between platen 23 and the auxiliary paper feed roller, and advanced by a predetermined amount depending on the rotation angle of platen 23.

Carriage 21 has a print head 211, and enables mounting of an ink jet cartridge of utilizable ink. On the bottom face of print head 211 are disposed nozzles for ejecting utilizable ink (not shown).

Figure 7:
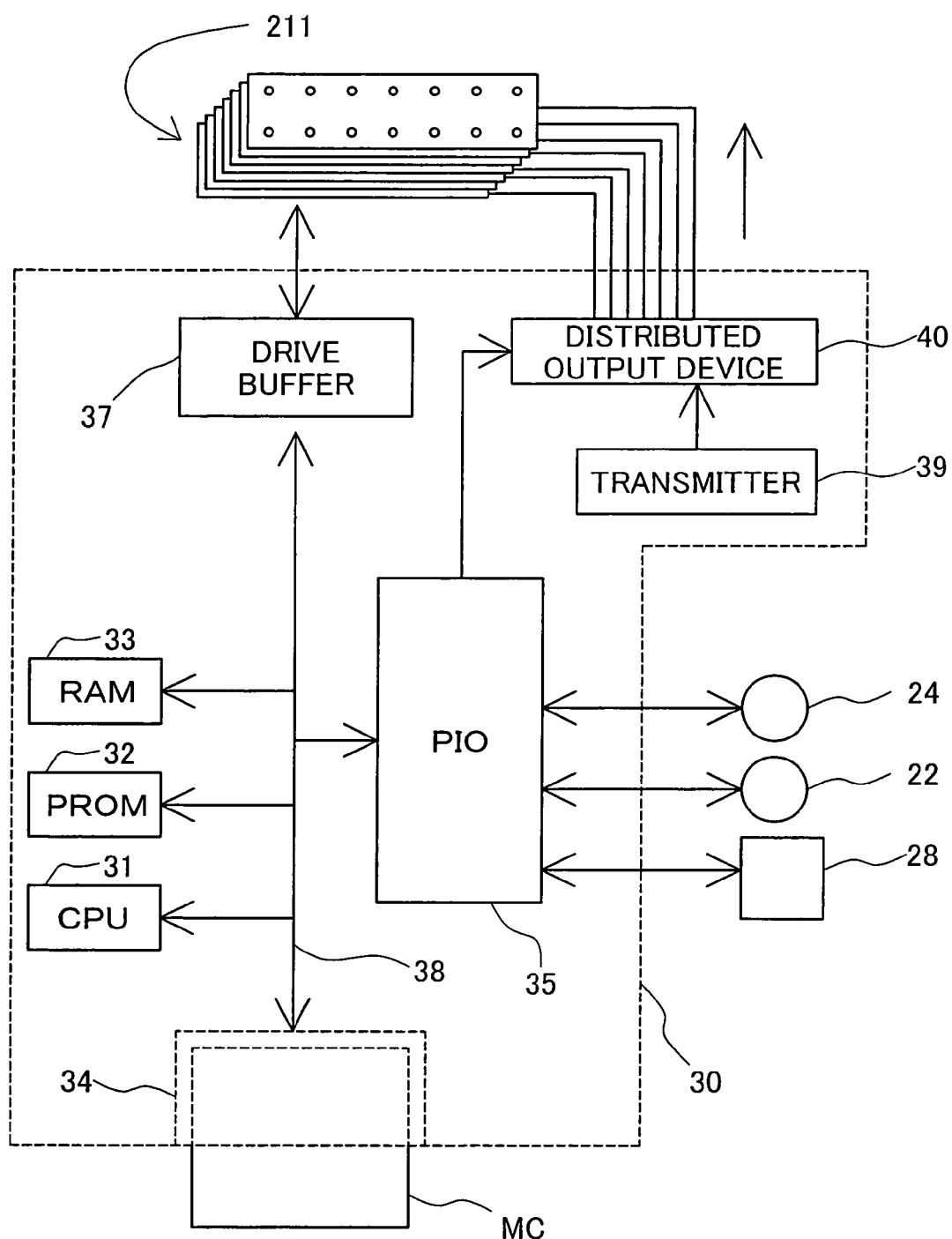
FIG. 7 is a block diagram showing an arrangement of printer 20, centered on the control circuit 30 of printer 20.

FIG. 7 is a block diagram showing an arrangement of printer 20, centered on the control circuit 30 of printer 20. Within control circuit 30 are disposed a CPU 31; PROM 32; RAM 33; a memory card slot 34 for acquiring data from a memory card MC; a peripheral device input/output unit (PIO) 35 for exchanging data with paper feed motor 24, carriage motor 22, etc.; a drive buffer 37, and the like. Drive buffer 37 is used as a buffer for supplying dot on/off signals to print head 211. These components are interconnected to a bus 38, enabling exchange of data among them. Control circuit 30 is also provided with a transmitter 39 for outputting a drive waveform at predetermined frequency, and a distributed output device 40 for distributing the output of transmitter 39 to print head 211 at predetermined timing.

Control circuit 30, while synchronizing with operations of paper feed motor 24 and carriage motor 22, outputs dot data to drive buffer 37 at predetermined timing. Control circuit 30 also reads an image file from memory card MC, analyzes the ancillary information, and performs image processing based on the image generation record information acquired thereby. That is, control circuit 30 functions as the image quality adjuster. The process flow of image processing executed by control circuit 30 will be described in detail hereinafter.

D. Image Processing in Digital Still Camera

Figure 8:
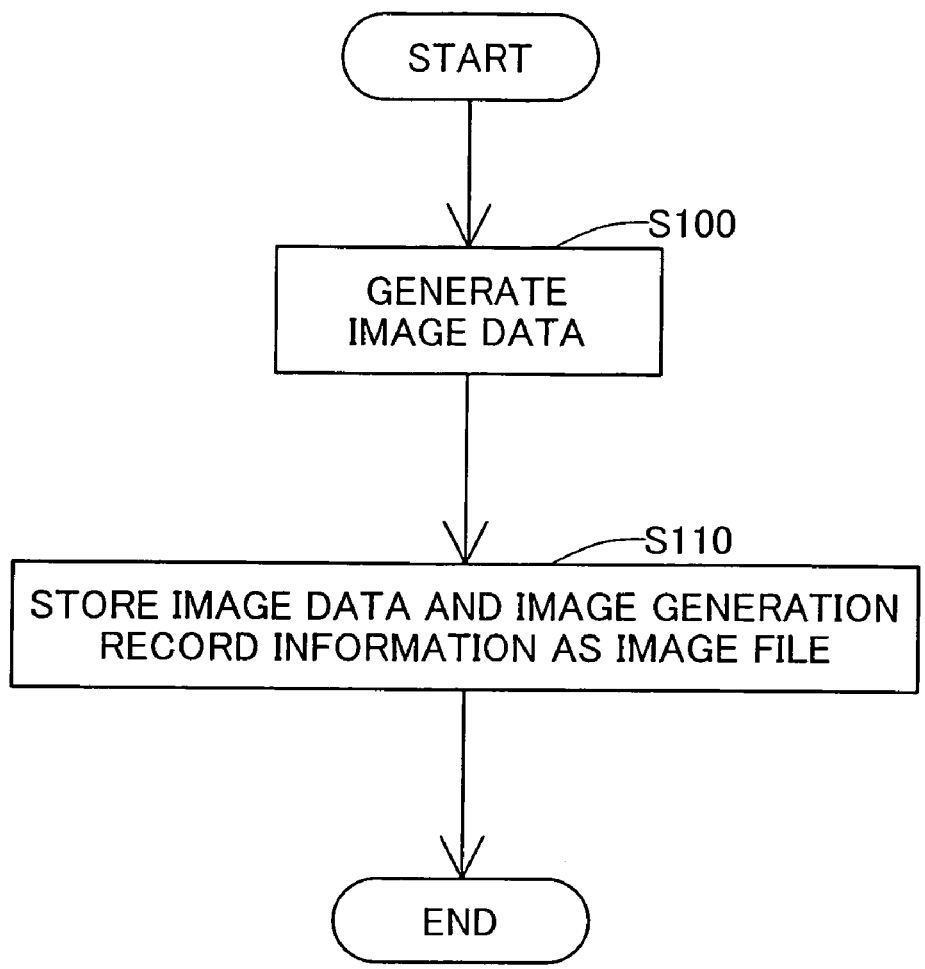
FIG. 8 is a flowchart showing a process flow for generating an image file GF in a digital still camera 12.

FIG. 8 is a flowchart showing process flow for generating an image file GF in digital still camera 12.

Control circuit 124 (FIG. 2) of digital still camera 12 generates image data GD in response to a shoot request, for example, depression of the shutter button (Step S100). Where aperture value, ISO speed, shooting mode and other parameter settings have been made, the set parameter values are used when generating the image data GD.

Control circuit 124 stores the generated image data GD and image generation record information GI as an image file GF on memory card MC (Step S110), and terminates the processing routine. Image generation record information GI includes parameters used at the time of image generation, such as aperture value, ISO speed, etc.; shooting mode and/or other arbitrarily set parameter values; and parameter values set automatically, such as maker name, model name, and the like. Image data GD also stores as image file GF image information that has been converted from the RGB color space to the YCbCr color space, and compressed in JPEG format.

By means of the aforementioned processes executed by digital still camera 12, both the image data GD and the image generation record information GI that includes various parameter values at the time of generation of image data, are constructed as an image file GF for storage on memory card MC.

E. Image Processing in Printer

Figure 9:
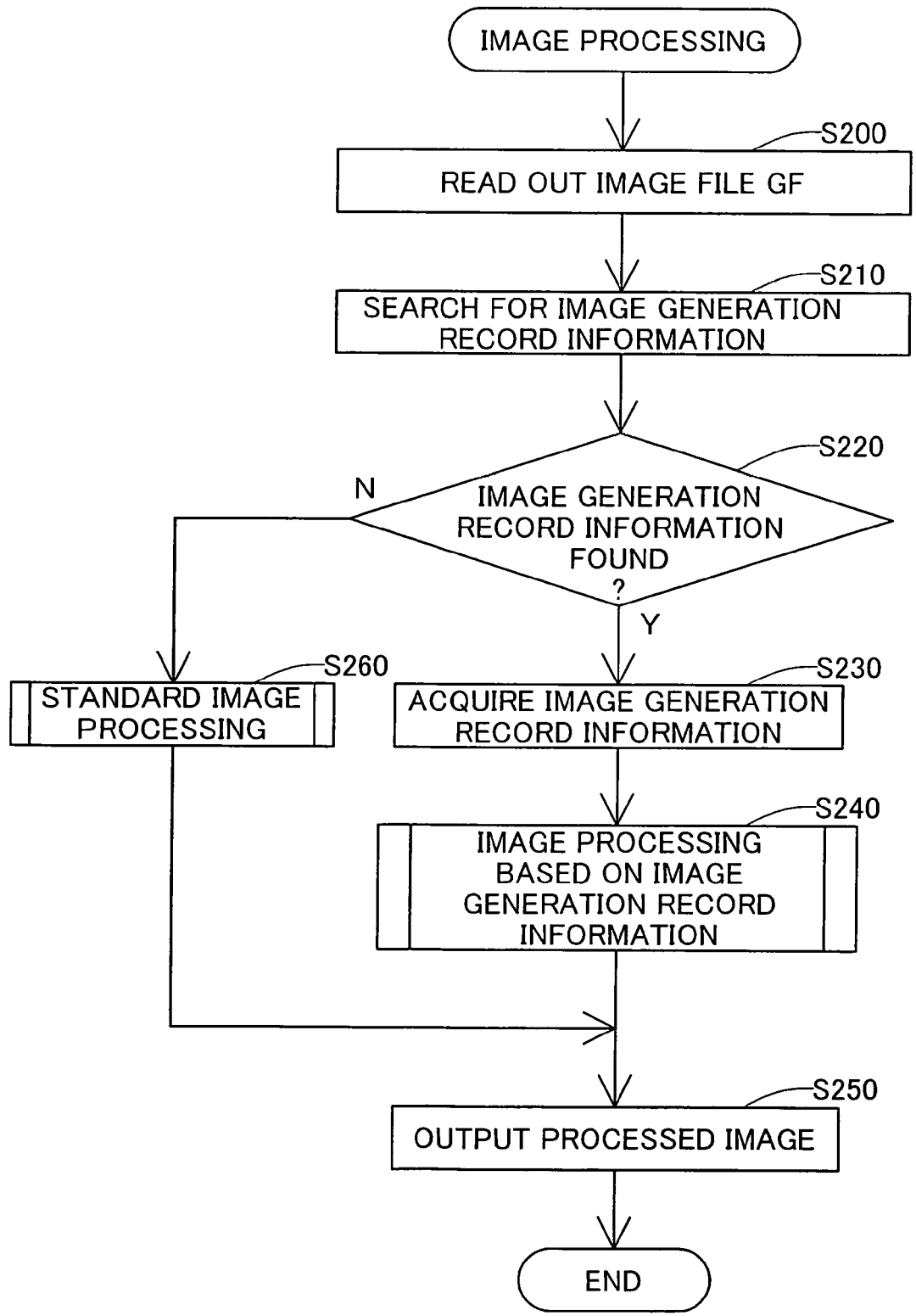
FIG. 9 is a flowchart showing a processing routine for image processing in printer 20.

FIG. 9 is a flowchart showing a processing routine for image processing in printer 20 of the embodiment. The following description is based on a scenario wherein a memory card MC having an image file GF stored thereon is inserted directly into printer 20. When memory card MC has been inserted into memory card slot 34, the CPU 31 of control circuit 30 (FIG. 7) of printer 20 reads out the image file GF (FIG. 3) from memory card MC (Step S200). Next, in Step S210, CPU 31 searches in the ancillary information storage field of image file GF for image generation record information GI indicating information at the time that the image data was generated. In the event that image generation record information GI is found (Step S220: Y), CPU 31 acquires and analyzes the image generation record information GI (Step S230). On the basis of the analyzed image generation record information GI, CPU 31 executes image processing, described hereinbelow (Step S240), outputs the processed image (Step S250), and terminates the processing routine.

An image file created by a drawing application or the like, on the other hand, will not have image generation record information GI that contains information such as aperture value and the like. If CPU 31 cannot find image generation record information GI (Step S200: N), it performs standard processing (Step S260), outputs the processed image (Step S250), and terminates the processing routine.

Figure 10:
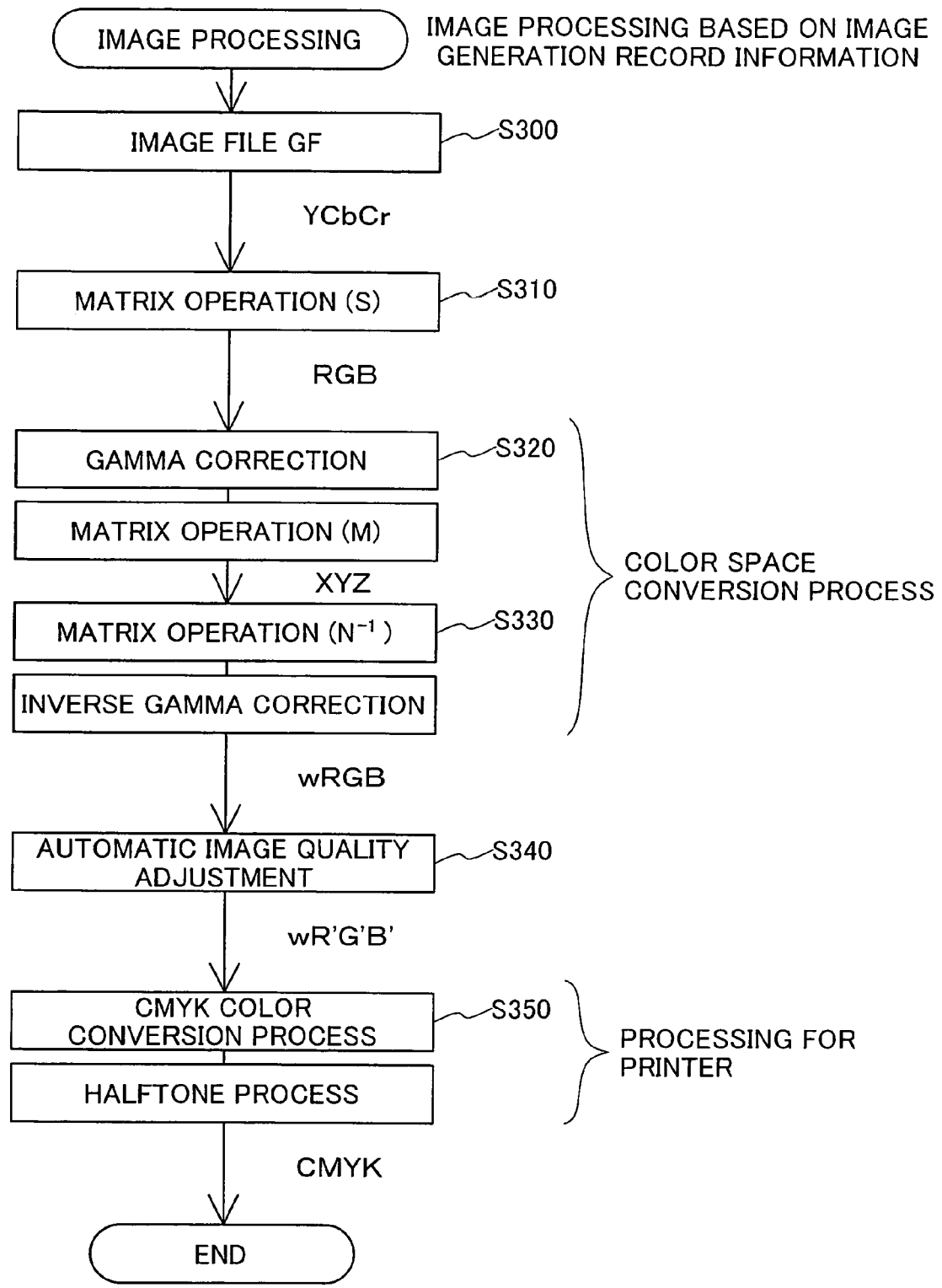
FIG. 10 is a flowchart showing a processing routine for image processing based on image generation record information.

FIG. 10 is a flowchart showing a processing routine for image processing (corresponding to Step S240 in FIG. 9) based on the image generation record information. The CPU 31 of control circuit 30 (FIG. 7) of printer 20 reads the image data GD from the read out image file GF (Step S300).

As mentioned previously, digital still camera 12 stores image data GD as JPEG format files, and in a JPEG format file image data is stored using an YCbCr color space. In Step S310, CPU 31 executes an operation using 3×3 matrix S to convert image data based on an YCbCr color space into image data based on an RGB color space. This matrix operation is represented by the following arithmetic expression, for example.

$$\begin{pmatrix} R \\ G \\ B \end{pmatrix} = S \begin{pmatrix} Y \\ Cb - 128 \\ Cr - 128 \end{pmatrix} \quad [\text{Eq. 1}]$$

$$S = \begin{pmatrix} 1 & 0 & 1.40200 \\ 1 & -0.34414 & -0.71414 \\ 1 & 1.77200 & 0 \end{pmatrix}$$

Where the color space of image data generated by digital still camera 12 is wider than a predetermined color space, for example, the sRGB color space, image data based on the RGB color space obtained in Step S310 may in some instances contain useful data that is outside the defined area of the RGB color space. Where image generation record information GI instructs that this out-of-defined area data be handled as valid data, the out-of-defined area data will be kept as-is, while continuing with subsequent image processing. In the absence of an instruction to handle out-of-defined area data as valid data, out-of-defined area data is clipped to the defined area. For example, where the defined area is 0-255, negative value data of less than 0 is rounded to 0, and data above 256 to 255. In the event that the color space that is reproducible by the image output unit is not wider than a predetermined color space, for example, the sRGB color space, it is preferable to perform clipping to the defined area regardless of any instruction in the image generation record information GI. Such instances may include, for example, cases where the image is output to a CRT, whose reproducible color space is the sRGB color space.

Next, in Step S320, CPU 31 performs gamma correction and an operation employing a matrix M, to convert image data based on an RGB color space to image data based on an XYZ color space. Image file GF may contain gamma value and color space information at the time of image generation. In the event that image generation record information GI includes this information GI, CPU 31 acquires the gamma value of the image data from the image generation record information GI, and executes a gamma conversion process of the image data using the acquired gamma value. CPU 31 then acquires color space information for the image data from the image generation record information GI, and executes a matrix operation of the image data using a matrix M for the color space. In the event that image generation record information GI does not contain a gamma value, a gamma conversion process can be executed using a standard gamma value. In the event that image generation record information GI does not contain color space information, matrix operations may be executed using a standard matrix M. A gamma value and matrix for the sRGB color space may be used respectively as this standard gamma value and matrix M. The matrix operation may be given by the following arithmetic expression, for example.

$$\begin{pmatrix} X \\ Y \\ Z \end{pmatrix} = M \begin{pmatrix} Rt' \\ Gt' \\ Bt' \end{pmatrix} \quad [\text{Eq. 2}]$$

$$M = \begin{pmatrix} 0.6067 & 0.1736 & 0.2001 \\ 0.2988 & 0.5868 & 0.1144 \\ 0 & 0.0661 & 1.1150 \end{pmatrix}$$

$Rt, Gt, Bt \geq 0$ $$Rt' = \left(\frac{Rt}{255}\right)^{\gamma} \quad Gt' = \left(\frac{Gt}{255}\right)^{\gamma} \quad Bt' = \left(\frac{Bt}{255}\right)^{\gamma}$$

$Rt, Gt, Bt < 0$ $$Rt' = -\left(\frac{-Rt}{255}\right)^{\gamma} \quad Gt' = -\left(\frac{-Gt}{255}\right)^{\gamma} \quad Bt' = -\left(\frac{-Bt}{255}\right)^{\gamma}$$

The color space of image data obtained after the matrix operation has been executed is an XYZ color space. The XYZ color space is an absolute color space, and is a device-independent color space not dependent on a device such as a digital still camera or printer. Thus, device-independent color matching may be carried out by means of color space conversion to the XYZ color space.

Next, in Step S330, CPU 31 performs an operation employing a matrix $N^{-1}$, and inverse gamma correction to convert image data based on the XYZ color space to image data based on wRGB color space. During inverse gamma correction, CPU 31 acquires a printer-side gamma value from PROM 32, and executes inverse gamma correction of the image data using the inverse of the acquired gamma value. CPU 31 then acquires from PROM 32 a matrix $N^{-1}$ that corresponds to the conversion from the XYZ color space to wRGB color space, and performs a matrix operation on the image data using this matrix $N^{-1}$. This matrix operation may be given by the following arithmetic expression, for example.

$$\begin{pmatrix} Rw \\ Gw \\ Bw \end{pmatrix} = N^{-1} \begin{pmatrix} X \\ Y \\ Z \end{pmatrix} \quad [\text{Eq. 3}]$$

$$N^{-1} = \begin{pmatrix} 3.30572 & -1.77561 & 0.73649 \\ -1.04911 & 2.1694 & -1.4797 \\ 0.06568289 & -0.241078 & 1.24898 \end{pmatrix}$$

$$Rw' = \left(\frac{Rw}{255}\right)^{1/\gamma} \quad Gw' = \left(\frac{Gw}{255}\right)^{1/\gamma} \quad Bw' = \left(\frac{Bw}{255}\right)^{1/\gamma}$$

Next, in Step S340, CPU 31 executes automatic adjustment processing of image quality. Automatic image quality adjustment processing in the embodiment involves automatic image quality adjustment processing of image data using the image generation record information contained in the image file GF, especially the flash parameter values as the light emission information for the supplemental light source. Automatic image quality adjustment processing is described hereinbelow.

Next, in Step S350, CPU 31 executes a CMYK color conversion process and a halftone process for the purpose of printing. In the CMYK color conversion process, CPU 31 refers to a look-up table (LUT), stored in PROM 32, for conversion from the wRGB color space to the CMYK color space, and converts the color space of the image data from the wRGB color space to the CMYK color space. That is, image data consisting of RGB tone level values is converted to image data for use by printer 20, consisting, for example, of tone level values for six colors, C (Cyan), M (Magenta), Y (Yellow), K (Black), LC (Light Cyan), and LM (Light Magenta).

In the halftone process, CPU 31 executes a so-called halftone process to produce halftone image data from the color-converted image data. This halftone image data is sequenced in the order of transmission to drive buffer 37 (FIG. 7) to produce final print data, whereupon the processing routine terminates. Image data processed by means of this processing routine is output in Step S250 of the image processing routine shown in FIG. 9.

F. Embodiments of Automatic Image Quality Adjustment Process

F1. Embodiment 1 of Automatic Image Quality Adjustment Process

Figure 11:
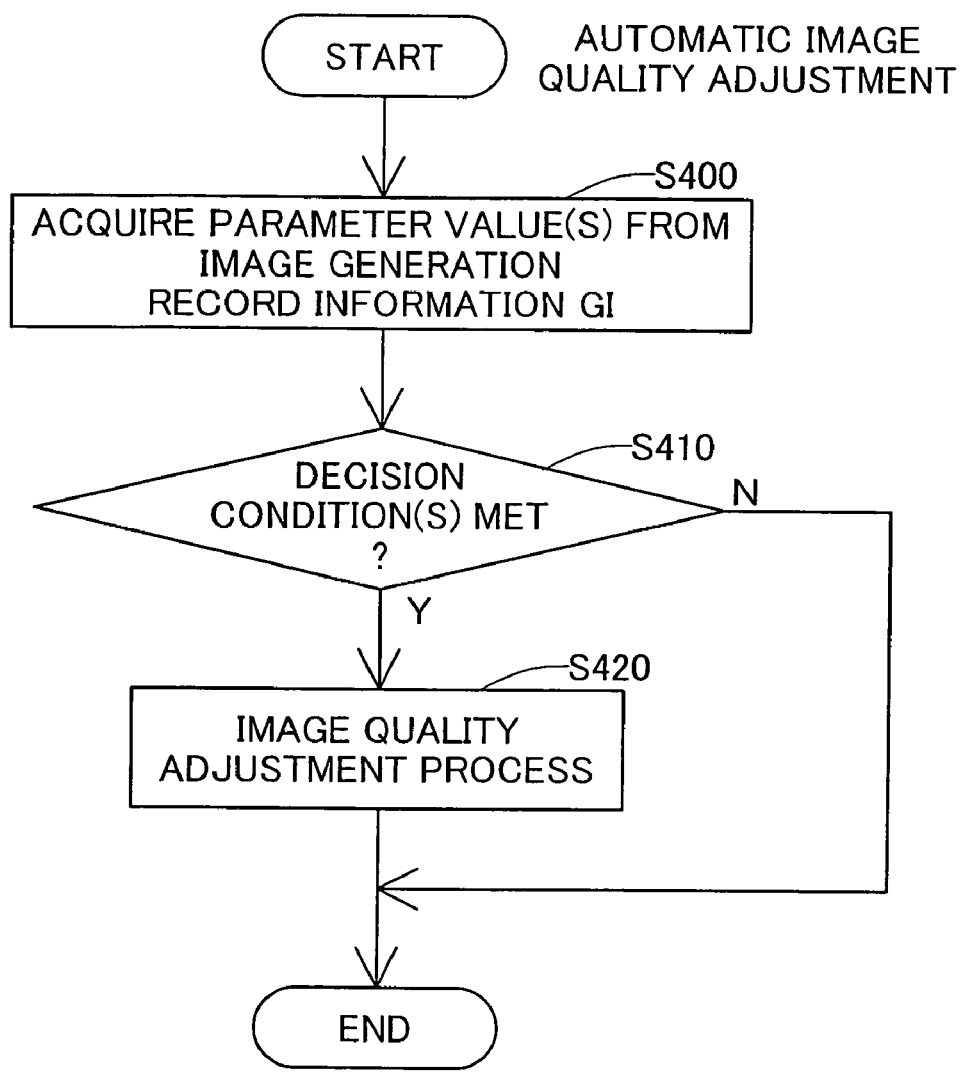
FIG. 11 is a flowchart showing a processing routine for an automatic image quality adjustment process.

FIG. 11 is a flowchart showing a processing routine for automatic image quality adjustment processing (corresponding to Step S340 in FIG. 10). CPU 31 (FIG. 7) analyzes the image generation record information GI and acquires parameter values for flash information etc. (Step S400). Next, in Step S410, CPU 31, on the basis of the acquired parameter values, makes a decision as to whether to execute image quality adjustment processing (described in detail hereinbelow). In the event that it is decided to execute image quality adjustment processing (Step S410: Y), in Step S420, CPU 31 executes image quality adjustment processing (described in detail hereinbelow). In Step S410, in the event that it is decided not to execute image quality adjustment processing (Step S410: N), the routine terminates.

In this embodiment, CPU 31 decides to execute image quality adjustment processing where the following condition is met.

(a1) Flash illumination was provided at the time of image data generation.

The decision regarding condition (a1) is made on the basis of flash information parameter values. In the event that the operation result contained in the flash information is Flash On, CPU 31 decides that condition (a1) has been met. As described previously, in the event that a reflected light sensing mechanism is present and sensed reflected light is absent, it is decided that the condition (a1) is not met, even if the operation result is Flash On. By so doing, image quality adjustment processing can be executed in the event that flash illumination was provided.

Figure 12:
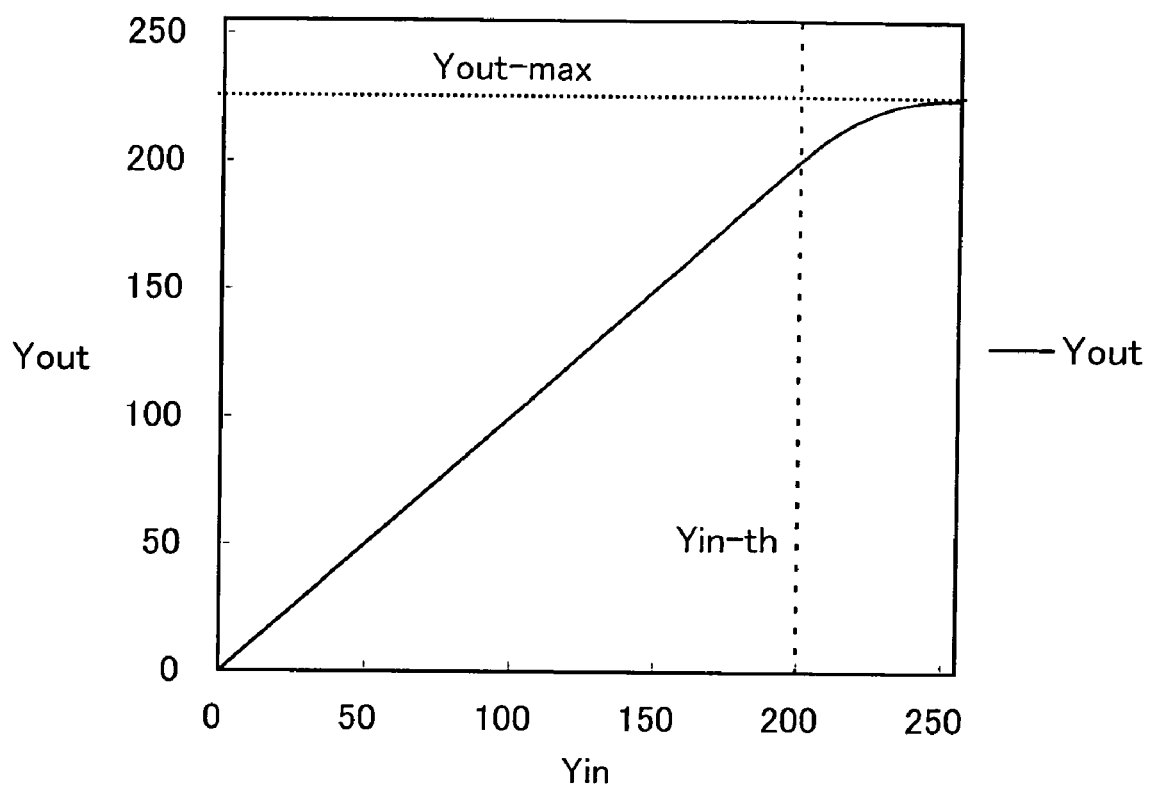
FIG. 12 is an explanatory diagram showing the relationship between luminance value input level and output level in a embodiment of an automatic image quality adjustment process.

FIG. 12 is an explanatory diagram showing the relationship between luminance value input level Yin and output level Yout in the image quality adjustment process of this embodiment. In the embodiment, the defined area for luminance value is 0-255. In the example shown in FIG. 12, luminance values are adjusted so that where luminance value input level Yin is at the maximum value within its possible range, luminance value output level Yout is a value smaller than the original value Yout-max. Further, the design is such that in the range over which input level is smaller than a predetermined value Yin-th, luminance values are not adjusted; and in the range over which it is larger than a predetermined value Yin-th, the proportional increase in output level relative to an increase in input level is smaller, the greater the input level. By so doing, without changing contrast in areas where luminance values are smaller than the predetermined value Yin-th, luminance values in a whiteout area, which is white owing to high luminance, is reduced, so as to prevent the whiteout area from standing out. Printers, which are frequently employed as image output devices, are ordinarily designed so that no ink is ejected onto areas where luminance values assume the maximum value within the possible range. Even in such instances, since luminance value output level is adjusted to below the maximum value within the possible range, standing out of whiteout areas due to absence of ink ejected thereon is prevented. Further, where the color space of image data subjected to image quality adjustment processing is a color space that includes brightness as a parameter, for example, where it is a YCbCr color space, image quality adjustment processing may be executed using those luminance values. Where the color space of image data is a color space that does not include luminance as a parameter, for example, as with the RGB color space, it is preferable to execute image quality adjustment processing after first converting to a color space that includes luminance as a parameter, for example, a YCbCr color space, HSL color space, or the like. By so doing, adjustment of luminance values may be executed easily. In this case, a process to again restore the original color space is executed after execution of image quality adjustment processing has been completed.

F2. Embodiment 2 of Automatic Image Quality Adjustment Process

In this embodiment, CPU 31 (FIG. 7) decides to execute image quality adjustment processing when the following conditions are met.

(a1) Flash illumination was provided at the time of image data generation; and (b1) Subject distance is equal to or less than a first predetermined value.

Condition (a1) is the same as condition (a1) in Embodiment 1. The decision regarding condition (b1) is executed on the basis of a parameter value of subject distance information acquired from the image generation record information GI. Whiteout areas are prone to occur when the amount of light on the subject from a supplemental light source exceeds the proper amount. Also, the smaller the subject distance (i.e. the closer it is), the greater the amount of light falling on the subject from the supplemental light source. In this embodiment, where the parameter value of subject distance information is equal to or less than a first predetermined value Lth decided in advance, for example, 2 meters or less, CPU 31 (FIG. 7) decides that condition (b1) is met. In this way, by executing an image quality adjustment process when subject distance is small, whiteout areas occurring due to the subject and image generating device being at near distance is prevented from standing out. In this embodiment, the range over which subject distance is equal to or less than the first predetermined value corresponds to the first predetermined near distance range.

F3. Embodiment 3 of Automatic Image Quality Adjustment Process

In this embodiment, as in Embodiment 2 described previously, CPU 31 (FIG. 7) decides to execute an image quality adjustment process when the following conditions are met.

(a1) Flash illumination was provided at the time of image data generation; and (b1) Subject distance is equal to or less than a first predetermined value.

Figure 13:
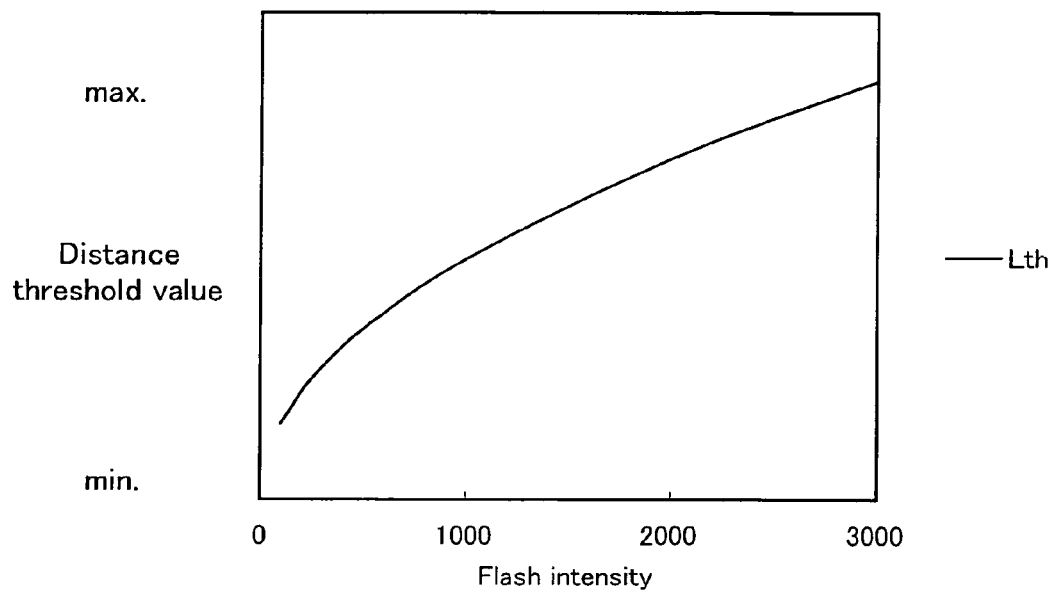
FIG. 13 is an explanatory diagram showing the relationship between a first predetermined value and flash intensity in a embodiment of an automatic image quality adjustment process.
Figure 14:
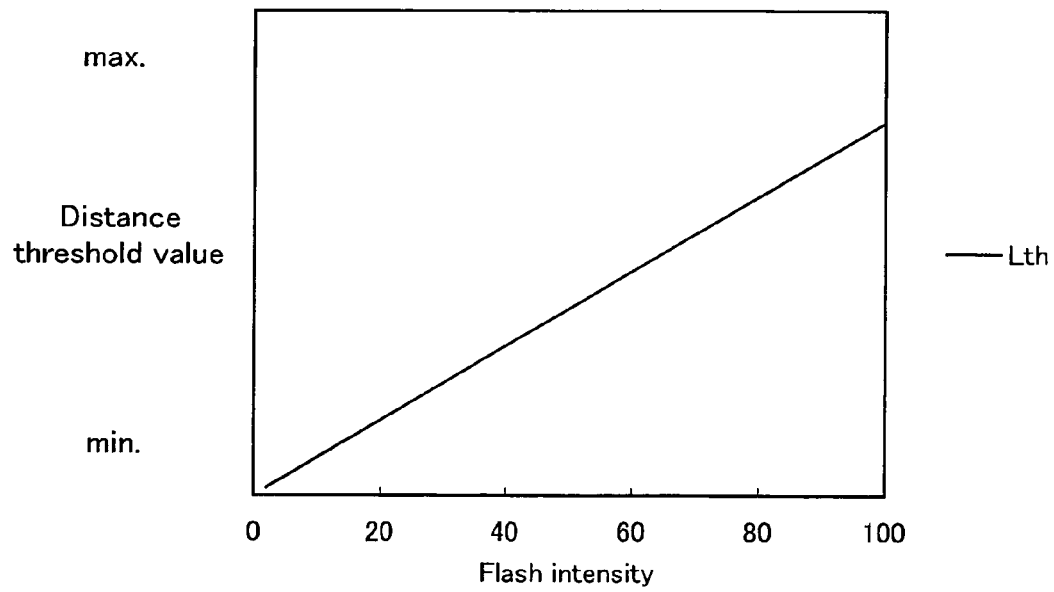
FIG. 14 is an explanatory diagram showing the relationship between a first predetermined value and flash intensity in another embodiment of an automatic image quality adjustment process.

The difference from Embodiment 2 described previously is that the first predetermined value Lth for the condition (b1) used for deciding to execute image quality adjustment processing is adjusted on the basis of flash intensity. Flash intensity is a parameter value of flash intensity information acquired from image generation record information GI. FIG. 13 is an explanatory diagram showing relationship between first predetermined value Lth and flash intensity in this embodiment. The amount of light falling on a subject from a supplemental light source is greater the higher the flash intensity. Thus, the higher the flash intensity is, the greater will be the first predetermined value Lth, i.e. the greater (more distant) will be the threshold value for distance at which whiteout areas are likely to occur. In the embodiment shown in FIG. 13, in consideration of the fact that the amount of light from a supplemental light source falling on the subject is inversely proportional to the square of the subject distance, first predetermined value Lth is proportional to the square root of flash intensity. CPU 31 (FIG. 7) decides that condition (b1) is met when subject distance is equal to or less than a first predetermined value Lth adjusted on the basis of flash intensity. By so doing, the decision of whether to execute image quality adjustment processing is executed appropriately on the basis of flash intensity. In this embodiment, the range over which subject distance is equal to or less than the first predetermined value corresponds to the first predetermined near distance range. Also, where the parameter value of flash intensity information is not the quantity of light value emitted by a supplemental light source, but rather a value wherein the quantity of emitted light is calibrated for an specific proper distance from the subject, for example, where it is a guide number, the first predetermined value Lth may be proportional to flash intensity, as shown in FIG. 14.

F4. Embodiment 4 of Automatic Image Quality Adjustment Process

In this embodiment, as in Embodiment 2 described previously, CPU 31 (FIG. 7) decides to execute image quality adjustment processing where the following conditions are met.

(a1) Flash illumination was provided at the time of image data generation; and (b1) Subject distance is equal to or less than a first predetermined value.

Figure 15:
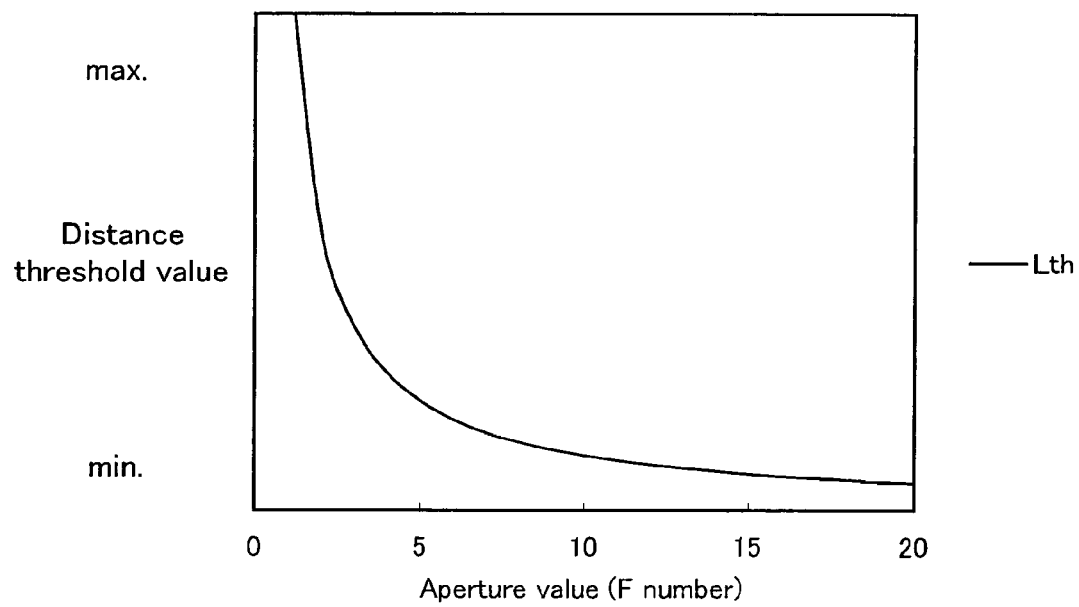
FIG. 15 is an explanatory diagram showing the relationship between a first predetermined value and F value in a embodiment of an automatic image quality adjustment process.

The difference from Embodiment 2 described previously is that the first predetermined value Lth for the condition (b1) used for deciding to execute image quality adjustment processing is adjusted on the basis of aperture value or F number. Aperture value or F number is a parameter value of aperture value information acquired from image generation record information GI. FIG. 15 is an explanatory diagram showing the relationship between first predetermined value Lth and F number in this embodiment. The amount of light received by optical circuit 121 (FIG. 2) of the image generating device is less the larger the F number. Thus, the larger the F number, the greater the appropriate amount of light received by the subject from the supplemental light source will be. That is, the larger the F number, the smaller (shorter distance) will be the first predetermined value Lth, i.e., the distance at which whiteout areas are prone to occur. In the embodiment shown in FIG. 15, in consideration of the fact that the amount of light received by the optical circuit of the image generating device is inversely proportional to the square of the F number, and is inversely proportional to the square of the subject distance, the first predetermined value Lth is inversely proportional to the F number. By so doing, CPU 31 (FIG. 7) can execute appropriately on the basis of F number the decision of whether to execute image quality adjustment processing.

F5. Embodiment 5 of Automatic Image Quality Adjustment Process

In this embodiment, as in Embodiment 2 described previously, CPU 31 (FIG. 7) decides to execute image quality adjustment processing where the following conditions are met.

(a1) Flash illumination was provided at the time of image data generation; and (b1) Subject distance is equal to or less than a first predetermined value.

Figure 16:
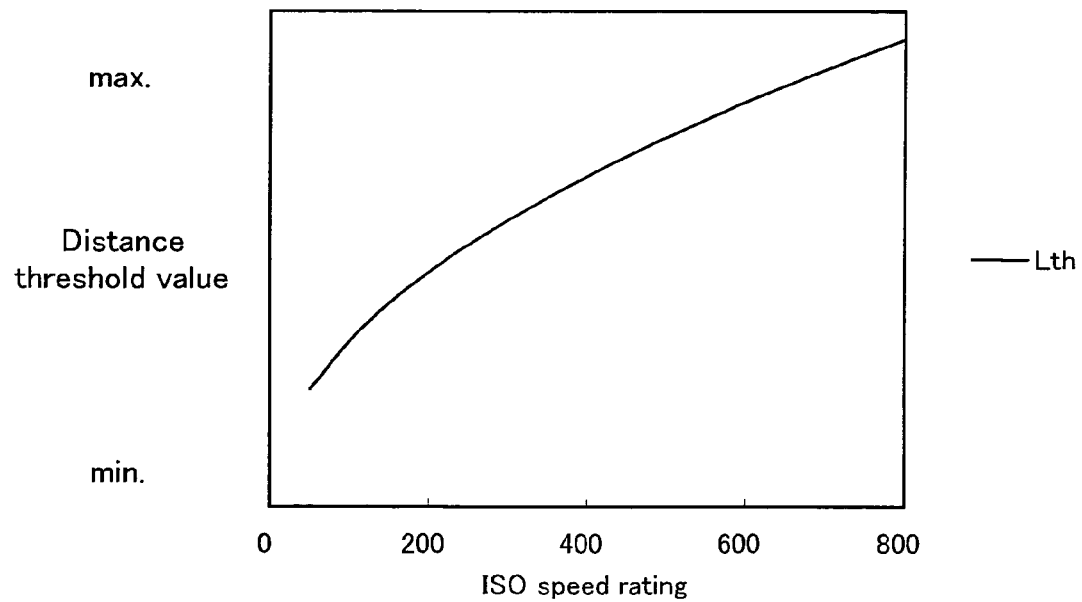
FIG. 16 is an explanatory diagram showing the relationship between a first predetermined value and ISO speed rate in a embodiment of an automatic image quality adjustment process.

The difference from Embodiment 2 described previously is that the first predetermined value Lth for the condition (b1) used for deciding to execute image quality adjustment processing is adjusted on the basis of ISO speed rating. ISO speed rating is a parameter value of ISO speed rating information acquired from image generation record information GI, and is a value wherein an index indicating sensitivity of optical circuit 121 of digital still camera 12 (FIG. 2) is represented using corresponding ISO speed. FIG. 16 is an explanatory diagram showing the relationship between first predetermined value Lth and ISO speed rating in this embodiment. The luminance value of image data generated by means of digital still camera 12 is greater the greater the ISO speed rating (sensitivity) of optical circuit 121. In other words, it may be the also that the apparent quantity of light received by optical circuit 121 is greater the greater the ISO speed rating. Thus, the greater the speed rating of optical circuit 121, the smaller the appropriate quantity of light received by a subject from the supplemental light source. That is, the greater the ISO speed rating, the greater (longer distance) the first predetermined value Lth, i.e., the distance at which whiteout areas are prone to occur. In the embodiment shown in FIG. 16, in consideration of the fact that luminance value of image data generated by an image generating device, i.e., the apparent quantity of light received by optical circuit 121, is proportional to ISO speed rating, the first predetermined value Lth is proportional to the square root of ISO speed rating. By so doing, CPU 31 (FIG. 7) can execute appropriately on the basis of ISO speed rating the decision of whether to execute image quality adjustment processing.

F6. Embodiment 6 of Automatic Image Quality Adjustment Process

In this embodiment, CPU 31 (FIG. 7) decides to execute image quality adjustment processing where the following conditions are met.

(a1) Flash illumination was provided at the time of image data generation; and (c1) Flash intensity is greater than a second predetermined value.

Condition (a1) is the same as condition (a1) in Embodiment 1. The decision regarding condition (c1) is executed on the basis of a parameter value of flash intensity information acquired from the image generation record information GI. Whiteout areas occur more readily where the quantity of light received by a subject from the supplemental light source exceeds the appropriate quantity. In this embodiment, where the parameter value of flash intensity information exceeds a second predetermined value determined in advance, for example, 1000 BCPS, CPU 31 (FIG. 7) decides that condition (c1) is met. In this way, by executing image quality adjustment processing when flash intensity is high, whiteout areas produced when the quantity of light from the supplemental light source is too great can be prevented from standing out. In this embodiment, the range over which flash intensity is equal to or less than the second predetermined value corresponds to the second predetermined range.

F7. Embodiment 7 of Automatic Image Quality Adjustment Process

In this embodiment, CPU 31 (FIG. 7) decides to execute image quality adjustment processing where the following conditions are met.

(a1) Flash illumination was provided at the time of image data generation; and (d1) The largest whiteout area size is greater than a predetermined threshold value.

Condition (a1) is the same as condition (a1) in Embodiment 1. The decision regarding condition (d1) is executed on the basis of the sizes of whiteout areas, obtained by analysis of image data. A whiteout area is an area of interlinked pixels having luminance values equal to or greater than a first predetermined luminance value. As the first predetermined luminance value, there may be employed, for example, the maximum luminance value which is the maximum within the possible range thereof (255 where luminance values are represented on 8 bits). In this case, an area in which maximum brightness pixels whose luminance value is the maximum possible value are linked is used as a whiteout area. A value smaller than the maximum luminance value may be used as the first predetermined luminance value. By so doing, the whiteout area may be made to include, in addition to an area of interlinked maximum brightness pixels, the surrounding area as well. The first predetermined luminance value may be determined on the basis of sensory evaluation of the output result of the image. Whiteout area size may be represented in terms of the number of pixels making up the area.

As a method for deciding whether two pixels A, B are interlinked, there may be used a method wherein it is decided that the two are interlinked where pixel B is situated within a predetermined distance from pixel A. For example, in image data having pixels arrayed in grid form, where this predetermined distance is set to 1.5 pixels, it will be determined that the two pixels are linked where pixel B is situated at any of the eight-neighbor pixel locations surrounding pixel A.

As the method for dividing a plurality of pixels into pixel areas, a method whereby they are assigned to area by treating a plurality of pixels linked to a common pixel are treated as belonging to the same given area may be employed. By means of this method, one or several whiteout areas will be composed from a plurality of pixels having luminance values equal to or greater than a first predetermined luminance value.

Figure 17:
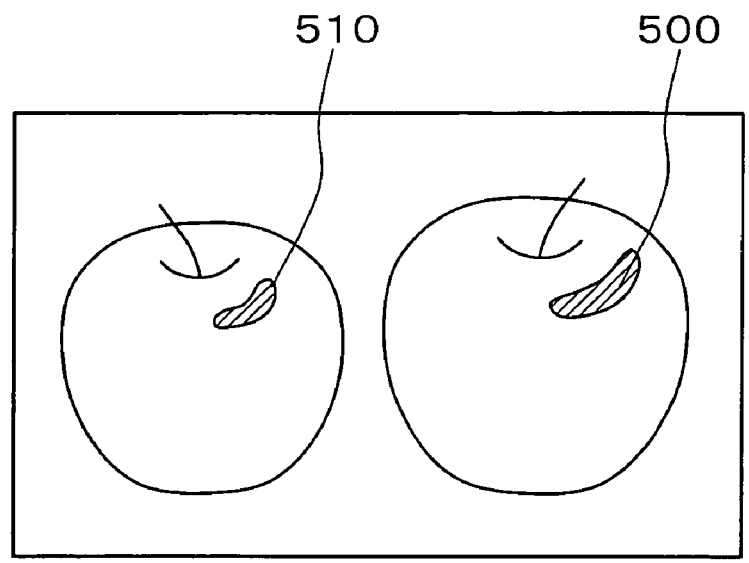
FIG. 17 is an explanatory diagram depicting an example of a whiteout area in an image.

FIG. 17 is an explanatory diagram describing an example of a whiteout area in an image. FIG. 17 is an image in which two fruits are shown; areas of luminance values equal to or greater than a first predetermined luminance value are indicated by hatching. Pixels in the areas indicated by hatching are identified as two whiteout areas 500 and 510 by the above described area dividing method. Since whiteout areas 500 and 510 are not interlinked, they are treated as separate whiteout areas. Where a plurality of whiteout areas are present in this manner, the size of the largest whiteout area is used during the decision regarding condition (d1). In the example shown in FIG. 17, the size of whiteout area 500 is used, for example.

In this embodiment, where whiteout area size (or where there are a plurality of whiteout zones, the largest value of size thereof is greater than a predetermined threshold value, for example, 5% of all pixels in the image, CPU 31 (FIG. 7) decides that condition (d1) is met. By so doing, in the event that a large whiteout area should occur, the area can be prevented from standing out.

In this embodiment, (a1) and (d1) are employed as decision conditions for executing image quality adjustment processing, but an arrangement wherein only (d1) is used is acceptable as well. By so doing, large whiteout areas can be prevented from standing out regardless of whether or not illumination is provided by a supplemental light source. Decision condition (d1) enables decisions to be made without using the image generation record information, enabling an arrangement whereby even in standard image processing in the absence of image generation record information (Step S260 in FIG. 9), image quality adjustment processing is executed in the event that decision condition (d1) is met.

F8. Embodiment 8 of Automatic Image Quality Adjustment Process

Figure 18:
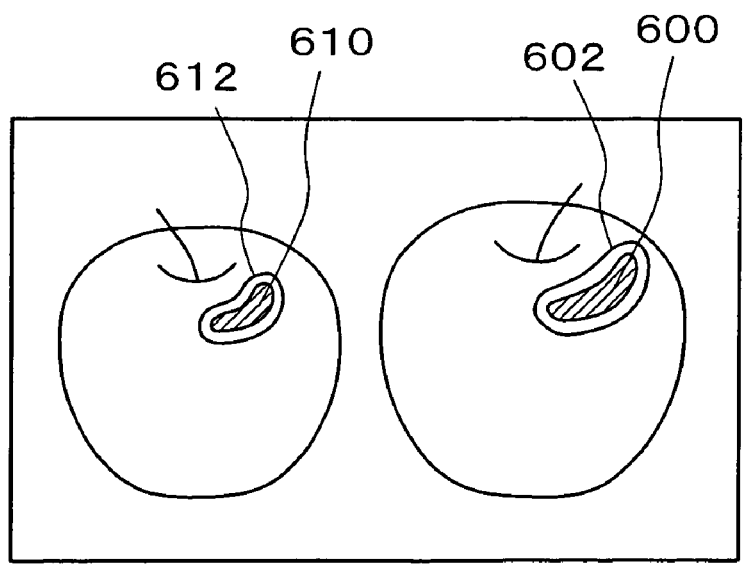
FIG. 18 is an explanatory diagram depicting an example of a whiteout area and an image quality adjustment process target area in an image.

In this embodiment, in contrast to the embodiments described previously, pixels targeted for image quality adjustment processing may be selected from a first type area, plus a second type area which is the area surrounding the first type area. The first type area is a maximum luminance area of linked maximum luminance pixels whose luminance values are the maximum value possible. FIG. 18 is an explanatory diagram describing an example of a first type area and an image quality adjustment process target area in an image. In FIG. 18, two first type areas 600 and 610 are shown hatched; image quality adjustment process target areas 602, 612, which each include a first type area and a surrounding second type area, are also shown. As the second area, there may consist of, for example, pixels whose shortest distance from the first type area is a first predetermined distance, for example, 5 pixels or fewer. In this way, by targeting for processing an area that includes a first type area whose luminance value is the maximum possible and a second type area which is the area surrounding same, image quality adjustment processing is executed without altering image quality in areas not including the first areas, and without making the boundary between the first type area of maximum brightness and the surrounding area stand out.

As a method for selecting the surrounding area as a second type area, there may be employed a method of selection on the basis of the magnitude of luminance value, rather than on the basis of only distance from the first type area. For example, an area composed of pixels whose luminance values are equal to or greater than a second luminance value (which is close to maximum luminance value) and linked to the first type area may be selected as a second type area. By so doing, in areas that are brighter than the second luminance value, a boundary is created between an area targeted for processing and an area not targeted for processing, so that the boundary is prevented from standing out. The second luminance value may be determined on the basis of sensory evaluation of image output results, so as to optimize image output results. Where luminance value adjustment is carried out as depicted in FIG. 12, the minimum luminance value Yin-th subject to adjustment of luminance value may be used as the second predetermined luminance value. By so doing, image quality adjustment processing can be performed without the boundary between an area targeted for processing and an area not targeted for processing standing out. The second predetermined luminance value for determining an area targeted for processing may be the same as the first predetermined luminance value for determining whiteout areas, used in the image quality adjustment processing decision. In this case, whiteout areas will be selected as areas targeted for image quality adjustment processing.

F9. Embodiment 9 of Automatic Image Quality Adjustment Process

In the preceding embodiments, there is executed an image quality adjustment process that involves adjusting the luminance value; however, an additional image quality adjustment process that involves adjusting hue and/or saturation of the area targeted for processing may be executed as well. For example, where there is little change in hue in the area surrounding an area targeted for processing, the hue of the area targeted for processing may be adjusted to the average value of hue for the surrounding area. By so doing, the hue of the area targeted for processing is made to approximate the hue of the surrounding area, thereby further preventing the area targeted for processing from standing out. As regards saturation, it is preferable to adjust it to a value about equal to or smaller than saturation in the surrounding area. The saturation level may be represented by the average value or minimum value for saturation in the surrounding area. By so doing, an area targeted for processing can be prevented from being more brightly colored and standing out from the surrounding area.

F10. Embodiment 10 of Automatic Image Quality Adjustment Process

Figure 19:
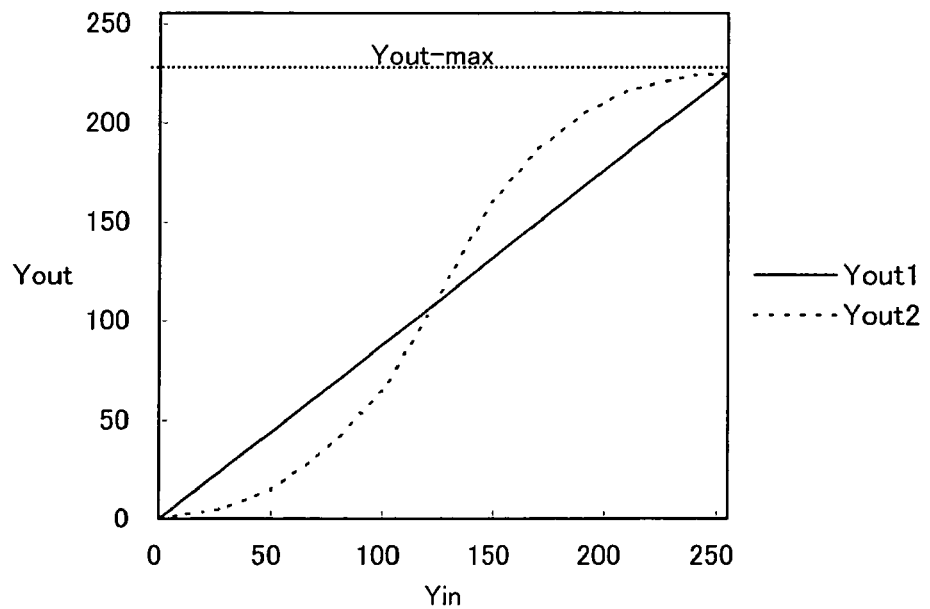
FIG. 19 is an explanatory diagram showing the relationship between luminance value input level and output level in another embodiment of an automatic image quality adjustment process.

FIG. 19 is an explanatory diagram showing another embodiment of the relationship between luminance value input level Yin and output level Yout in an image quality adjustment process. FIG. 19 shows two exemplary characteristics Yout1 and Yout2. Yout1, in contrast to the embodiment in FIG. 12, is designed so that the proportion of increase in output level relative to an increase in input level is constant regardless of input level. By so doing, change in luminance values in gradation areas wherein luminance value varies appreciably can be represented smoothly. Yout2 is designed such that there is a large rate of change in output level in areas of intermediate input level. By so doing, contrast can be enhanced. The relationship between luminance value input level and output level may be determined on the basis of sensory evaluation of image output results, so as to optimize image output results. In any event, adjustment of luminance values is executed such that, where luminance value input level is at maximum value within the possible range, luminance value output level is smaller than the original value.

F11. Embodiment 11 of Automatic Image Quality Adjustment Process

Figure 20:
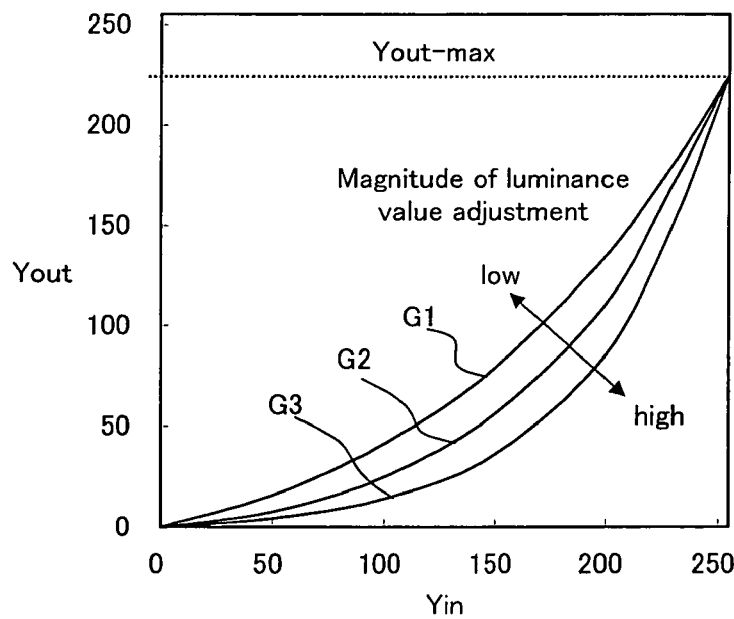
FIG. 20 is an explanatory diagram showing the relationship between luminance value input level and output level in another embodiment of automatic image quality adjustment processing.

FIG. 20 is an explanatory diagram showing another embodiment of the relationship between luminance value input level and output level in an image quality adjustment process. Graph G1 is designed so that the proportion of increase in output level Yout relative to an increase in input level Yin is greater in the area in which input level Yin is high. Thus, contrast of bright areas will be enhanced. Graphs G2 and G3 show input/output relationships used in processing at a higher magnitude of luminance value adjustment than in graph G1. Here, a "higher magnitude of luminance value adjustment" means a greater proportion of increase in output level Yout relative to an increase in luminance value input level Yin. In preferred practice, the magnitude of luminance value adjustment will be higher, the greater the quantity of light received by a subject. For example, the magnitude may be designed so as to increase in association with an increase in flash intensity. Alternatively, the magnitude may be designed to decrease with an increase in aperture or with an increase in subject distance, and to increase with an increase in ISO speed rating. By adjusting the magnitude of luminance value adjustment on the basis of the image generation record information, an image quality adjustment process appropriate to image data generated under various different conditions can be executed. In any event, adjustment of luminance values is executed such that, where luminance value input level is at maximum value within the possible range, luminance value output level is smaller than the original value.

G. Arrangement of Image Output System Employing Image Data Processing Device

Figure 21:
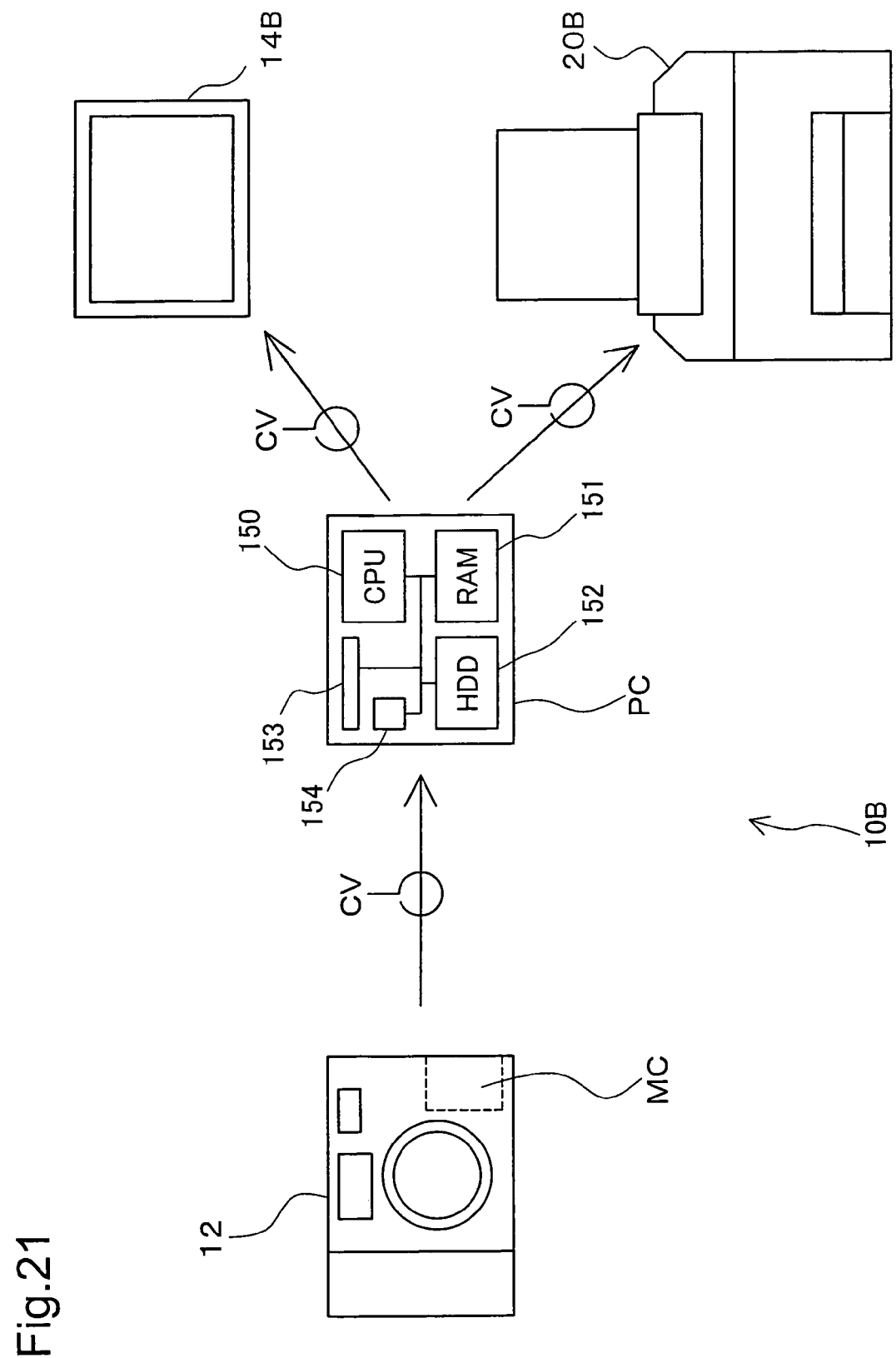
FIG. 21 is an explanatory diagram showing an example of an image output system in which an image data processing device may be implemented.

FIG. 21 is an explanatory diagram showing an example of an image output system in which an image data processing device may be implemented by way of a embodiment of the invention. Image output system 10B comprises a digital still camera 12 as an image generating device for generating image files; a computer PC for executing image quality adjustment processing based on an image file; and a printer 20B as an image output device for outputting images. Computer PC is computer of commonly used type, and functions as an image data processing device. As the image output device, a CRT display, LCD display, or other monitor 14B, a projector, or the like may be used instead of printer 20B. In the following description, it is assumed that a printer 20B is used as the image output device. This embodiment differs from the image output system example described previously (FIG. 1) in that the image data processing device realizing the image quality adjusting unit is independent of the image output device realizing the image output unit. The computer PC serving as the image data processing device, and the printer realizing the image output unit, can be termed an "output device" in the broad sense.

An image file created in digital still camera 12 is transferred to computer PC via a cable CV, or by directly inserting into computer PC a memory card MC having the image file stored thereon. Computer PC executes image quality adjustment processing of the image data, based on the image file that has been read in. The image data produced by the image quality adjustment process is transferred to printer 20B via a cable CV, and is then output by printer 20B.

Computer PC comprises a CPU 150 that executes a program for realizing the aforementioned image quality adjustment process; RAM 151 for temporarily storing results of operations by CPU 150, image data, and the like; and a hard disk drive (HDD) 152 for storing data needed for image quality adjustment processing, such as an image quality adjustment processing program, a lookup table, an aperture value table, and the like. CPU 150, RAM 151, and HDD 152 function as the image quality adjusting unit. Computer PC further comprises a memory card slot 153 for installing a memory card MC; and an input/output terminal 154 for connecting a connector cable from digital still camera 12 or the like.

An image file GF generated by a digital still camera 12 is supplied to computer PC via a cable or via a memory card MC. When an image data processing application program, either an image retouching application program or a printer driver, is run under user control, CPU 150 executes an image processing routine (FIG. 9) to process the image file GF which has been read in. Alternatively, the image data processing application program may be set to start up automatically when a memory card MC is inserted into memory card slot 153, or when connection of a digital still camera 12 to input/output terminal 154 via a cable is detected.

Image data processed by CPU 150, rather than being output in Step S250 of the image processing routine (FIG. 9), is instead transferred to an image output device, for example, printer 20B, whereupon the image output device receiving the image data executes image output.

In this embodiment, since image processing is carried out using an image quality adjusting unit provided to computer PC, it is possible to use an image output device that does not have an image quality adjusting unit. Where the image output device per se comprises an image quality adjusting unit, image data may be output to the image output device without being subjected to image processing on computer PC, with image processing instead being carried out by the image quality adjusting unit of the image output device. Alternatively, where the image generating device comprises an image quality adjusting unit (for example, where digital still camera 12 comprises an image quality adjusting unit), an image generating device arrangement whereby image processing is performed within the image generating device, and the processed image data then output directly to a printer, monitor or other image output device may also be possible.

As described hereinabove in the embodiments, image quality of an image in which a whiteout area would occur can be adjusted automatically, so that output results of high quality can be obtained readily.

The invention is not limited to the embodiments set forth hereinabove, and may be reduced to practice in various embodiments without departing from the scope and spirit thereof. The following variations are possible, for example.

H. Variations

H1. Variation 1

In the embodiments hereinabove, the first predetermined value for the decision condition (b1) for executing an image quality adjustment process may be designed to be adjustable on the basis of a plurality of parameter values. For example, an arrangement in which adjustment is made on the basis of flash intensity and aperture value or F number is possible. An arrangement in which a parameter value for use in adjusting the first predetermined value is selected based on types of information included in image generation record information GI may be made as well. For example, where image generation record information GI includes flash intensity and ISO speed rating, there is possible an arrangement whereby the first predetermined value is adjusted on the basis of flash intensity and ISO speed rating; or where flash intensity and aperture value are included, the first predetermined value may be adjusted on the basis of flash intensity and aperture value. In this way, by selecting decision conditions based on information included in image generation record information GI, more appropriate decisions can be executed.

H2. Variation 2:

An arrangement whereby a decision condition for executing image quality adjustment processing is selected for use among a plurality of decision conditions based on information included in image generation record information GI is also possible. For example, where the image generation record information GI includes flash information, subject distance information, and aperture value information, the decision may be executed on the basis of decision conditions (a1), (b1), and (d1); where the image generation record information GI includes only flash information, the decision may be executed on the basis of decision conditions (a1) and (d1). In this way, by selecting a decision condition based on information included in image generation record information GI, more appropriate decisions can be executed.

H3. Variation 3:

As information relating to the distance between a subject and the image generating device, employed as the aforementioned decision condition (b1), distance information other than subject distance information but that enables a distance range to be set as a parameter value may be used instead. For example, the decision regarding condition (b1) may be made using subject distance range information set by selecting from among three distance ranges, macro (0-1 meter), close-up (1-3 meters), or landscape (3 meters or more). In this case, the decision regarding condition (b1) is made by pre-establishing a typical distance for each of the distance ranges, and comparing the typical distance with a first predetermined value of condition (b1). As a typical distance, for example, for a distance range having an upper limit value and a lower limit value established for distance, the median value may be used; and for a distance range defined only by an upper limit value or by a lower limit value, the upper or lower limit value may be used. Similarly, the magnitude of luminance value adjustment may be adjusted on the basis of subject distance range.

H4. Variation 4:

Where generation of image data is performed with a supplemental light source situated apart from an image generating device, it is preferable to execute the decision regarding execution of an image quality adjustment process on the basis of information relating to the distance between the supplemental light source and the subject. As a method for deciding based on the distance between a supplemental light source and a subject, there may be used a method whereby, for example, in condition (b1) in the preceding embodiments, the decision is made using the distance between supplemental light source and the subject, rather than subject distance. By so doing, a whiteout area produced as a result of the short distance between a supplemental light source and a subject can be prevented from standing out. Similarly, the magnitude of luminance value adjustment may adjusted on the basis of distance between a supplemental light source and the subject.

Figure 22:
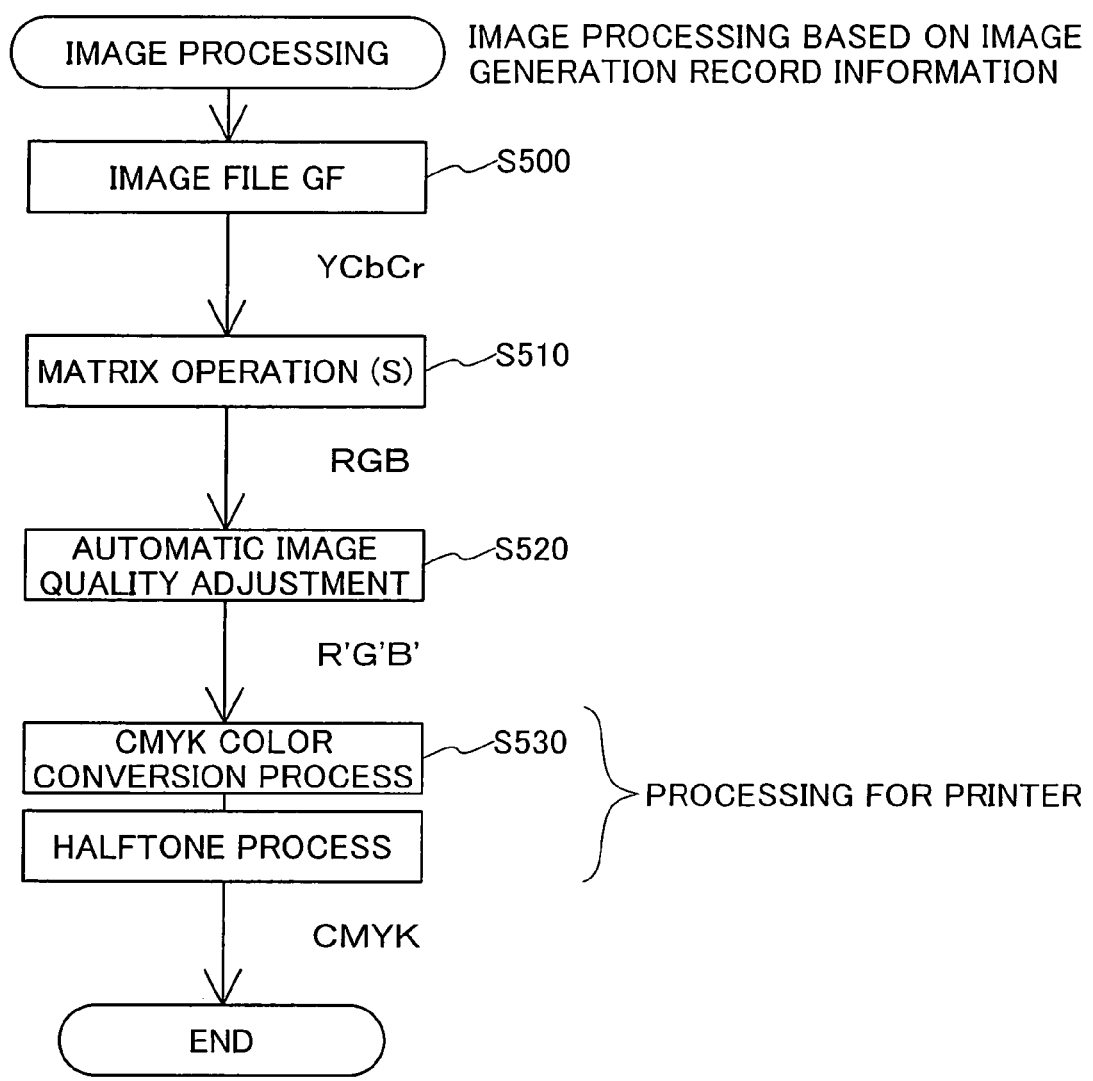
FIG. 22 is a flow chart showing an image processing routine from which the color space conversion process has been omitted.

H5. Variation 5:

Where an image file GF does not include image data gamma value or color space information, the color space conversion process of the image processing routine shown in FIG. 10 (Step S320 and Step S330) may be omitted. FIG. 22 is a flow chart showing an image processing routine from which the color space conversion process has been omitted. Image data acquired in Step S500 is converted from image data based on a YCbCr color space to data based on an RGB color space in Step S510. Next, in Step S520, automatic image quality adjustment processing is executed using the image data obtained in Step S510. Next, in Step S530, a CYMK conversion process and halftone process for printing are executed.

Figure 23:
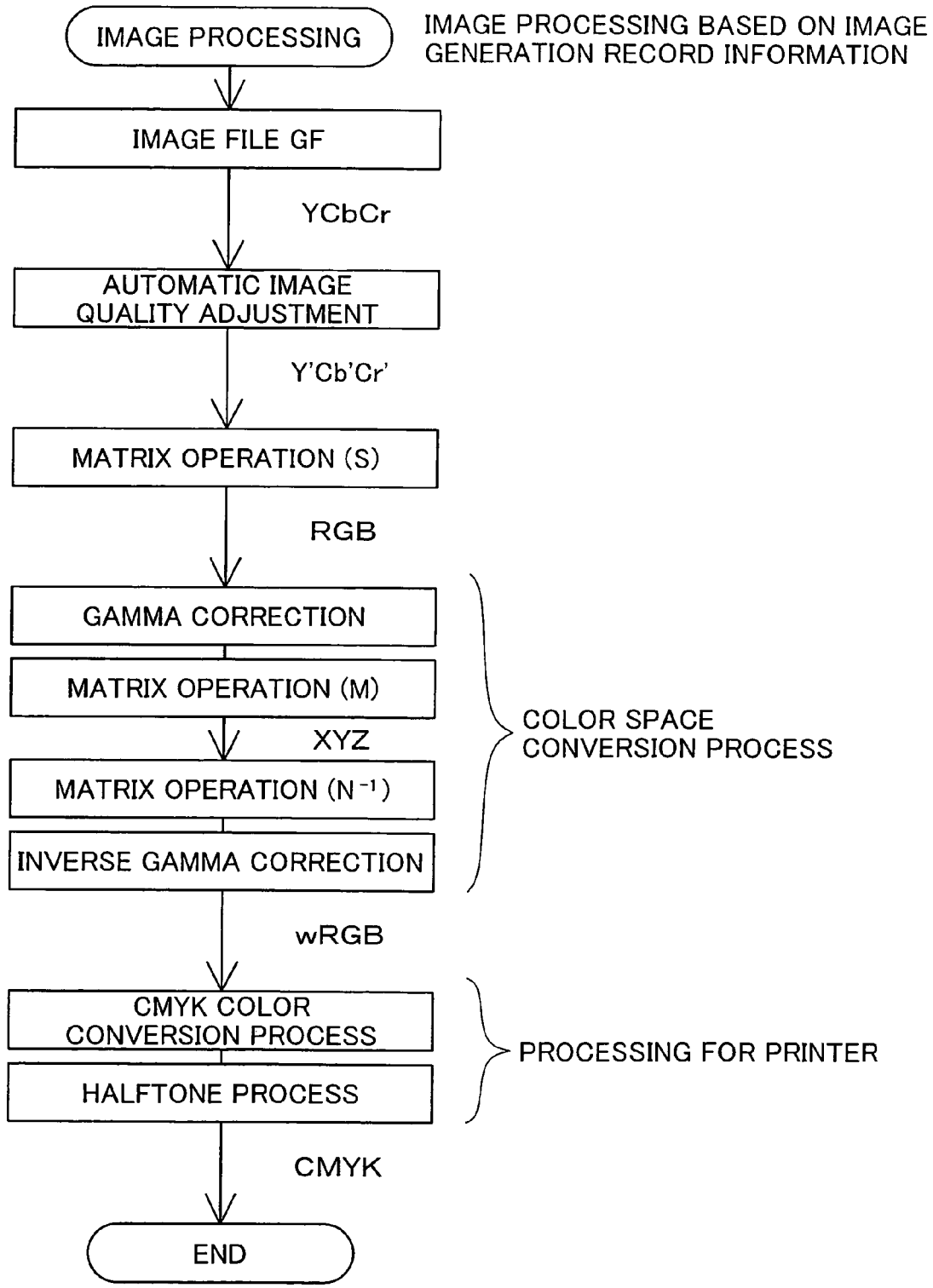
FIG. 23 is a flowchart showing another processing routine for image processing based on image generation record information.

H6. Variation 6:

In the preceding embodiments, automatic image quality adjustment processing is executed after executing color space conversion; however, color space conversion may instead be executed after executing automatic image quality adjustment processing. For example, image processing may be executed according to the flowchart shown in FIG. 23.

Figure 24:
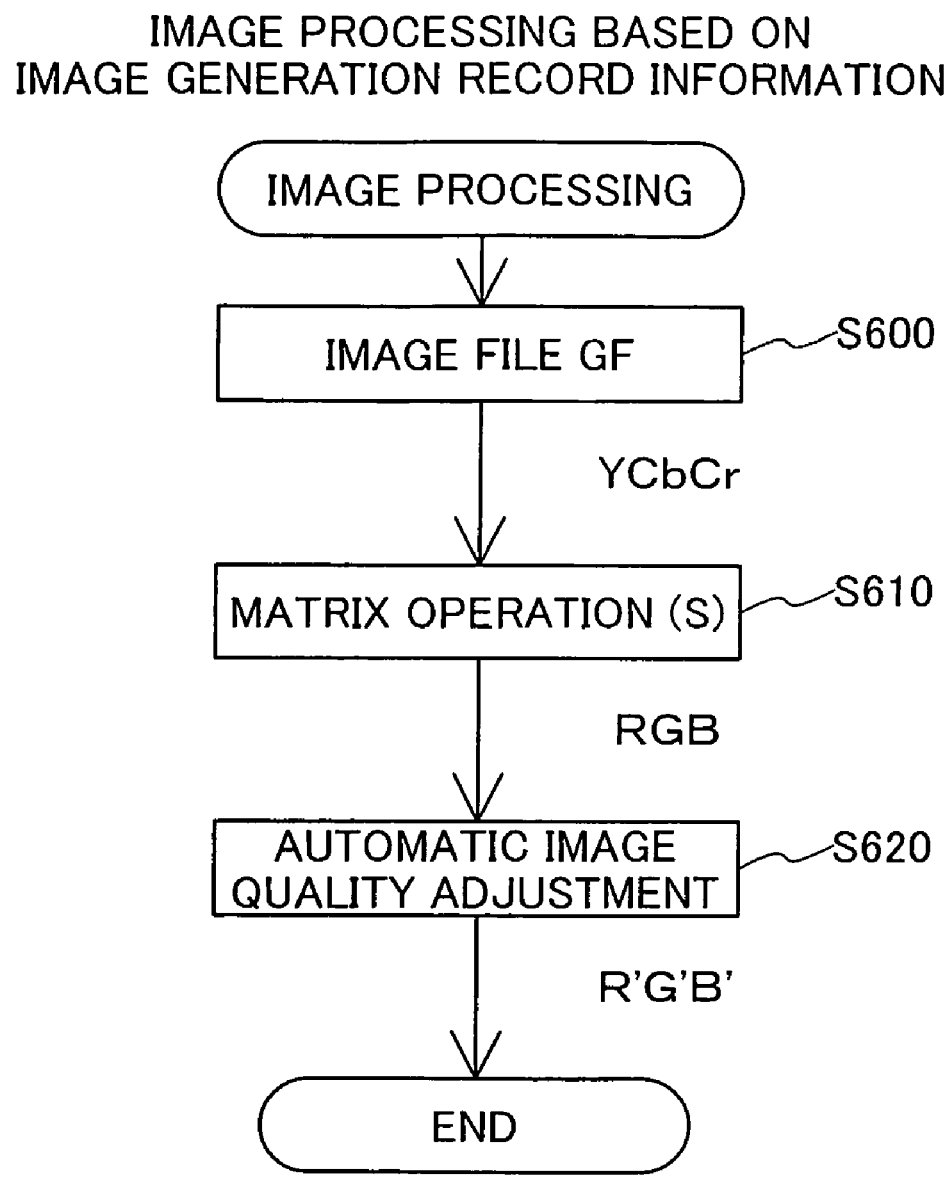
FIG. 24 is a flowchart showing another processing routine for image processing based on image generation record information.

H7. Variation 7:

In the preceding embodiments, a printer is used as the image output unit, but an image output unit other than a printer may be used instead. FIG. 24 is a flowchart showing a processing routine for image processing based on image generation record information where a CRT is used as the image output unit. In contrast to the flowchart in FIG. 10 which depicts the use of a printer as the image output unit, the CYMK conversion process and halftone process for printing are omitted. Also, since a CRT can represent an RGB color space of image data obtained by executing a matrix operation (S), the color space conversion process is omitted as well. Where image data based on an RGB color space obtained in Step S610 includes data outside the defined area of the RGB color space, the out-of-defined-area data is clipped, and step S620 is then executed. Where the color space utilizable by an image output unit is different from an RGB color space, a color conversion process to a color space utilizable by the image output unit is executed in a manner analogous to executing a CMYK color conversion process where a printer is used, and the resultant image is output by the image output unit.

H8. Variation 8:

In the preceding embodiments, description was made taking an Exif format file as a specific example of the image file GF; however, the format of the image file pertaining to the present invention is not limited to this. That is, any image file containing image data generated by an image generating device, and image generation record information GI describing conditions (information) at the time of generation of the image data, is acceptable. With such a file, image quality of image data generated by an image generating device may be appropriately adjusted automatically and output from an output device.

H9. Variation 9:

Values of matrices S, $N^{-1}$, and M in the equations are merely exemplary, and may be modified appropriately depending on color space on which the image file is based, color space utilizable by an image output unit, or the like.

H10. Variation 10:

In the preceding embodiments, use of a digital still camera 12 as the image generating device was described; however, image files may be generated using a different image generating device, such as a scanner, digital video camera, or the like instead.

H11. Variation 11:

In the preceding embodiments, the description took the example of a case where image data GD and image generation record information GI are contained in the same image file GF, but image data GD and image generation record information GI need not necessarily be stored within the same file. That is, it is sufficient for image data GD and image generation record information GI to be associated with each other; for example, it is acceptable to generate associating data that associates image data GD with image generation record information GI; store one or several sets of image data and image generation record information GI in independent files; and refer to the associated image generation record information GI when processing the image data GD. This is because, in this case, although the image data GD and image generation record information GI are stored in separate files, at the point in time of image processing which utilizes the image generation record information GI, the image data GD and image generation record information GI are in inseparably linked, and thus function substantially the same as if they were stored in the same file. That is, the term "image file GF" in the present embodiment includes those of a form wherein image data GD and image generation record information GI are associated, at least at the point in time that image processing takes place. The image file GF also includes motion video files stored on optical disk media such as CD-ROM, CD-R, DVD-ROM, DVD-RAM, and the like.

INDUSTRIAL APPLICABILITY

The present invention is applicable to various image processing devices including computers, printers, facsimile machines, and digital cameras.

What is claimed is:

1. An image processing method for performing image processing using image data generated by an image generation device, and image generation record information associated with the image data that includes light emission information of a supplemental light source at a time of generation of the image data and information relating to a distance between a subject of the image data and the image generation device of the image data at the time of generation of the image data, the method comprising:

(i) deciding, based on the light emission information for the supplemental light source included in the image generation record information, whether to execute an image quality adjustment process; and (ii) if a positive decision is made, executing the image quality adjustment process to adjust the image data so as to reduce a maximum luminance value which is a largest possible luminance value the image data may have, wherein the deciding whether to execute the image quality adjustment process includes deciding, based on the light emission information of the supplemental light source included in the image generation record information, whether illumination was provided by the supplemental light source at the time of generation of the image data, the executing of the image quality adjustment process includes executing the image quality adjustment process if a judgment is made that (a) illumination was provided by the supplemental light source at the time of generation of the image data, the executing of the image quality adjustment process includes halting execution of the image quality adjustment process, or reducing a magnitude of luminance value adjustment in the image quality adjustment process, irrespective of a positive or negative result of the judgment (a), if a judgment is made that (b) the distance from the subject is not within a first near distance range, the image generation record information further includes information relating to quantity of light of the supplemental light source at the time of generation of the image data, and the executing of the image quality adjustment process includes adjusting the first near distance range to be a range nearer than a range in which the supplemental light source is capable of illuminating a subject with the quantity of light, based on at least the quantity of light.

2. An image processing device for performing image processing using image data generated by an image generation device, and image generation record information associated with the image data that includes light emission information of a supplemental light source at a time of generation of the image data and information relating to a distance between a subject of the image data and the image generation device of the image data at the time of generation of the image data, the image processing device comprising:

an image quality adjuster configured to decide, based on the light emission information for the supplemental light source included in the image generation record information, whether to execute an image quality adjustment process, wherein if a positive decision is made, the image quality adjuster executes the image quality adjustment process to adjust the image data so as to reduce a maximum luminance value which is a largest possible luminance value the image data may have, wherein in deciding whether to execute the image quality adjustment process, the image quality adjuster is further configured to decide, based on the light emission information of the supplemental light source included in the image generation record information, whether illumination was provided by the supplemental light source at the time of generation of the image data, the image quality adjuster executes the image quality adjustment process if a judgment is made that (a) illumination was provided by the supplemental light source at the time of generation of the image data, the image quality adjuster halts execution of the image quality adjustment process, or reduces a magnitude of luminance value adjustment in the image quality adjustment process, irrespective of a positive or negative result of the judgment (a), if a judgment is made that (b) the distance from the subject is not within a first near distance range, the image generation record information further includes information relating to quantity of light of the supplemental light source at the time of generation of the image data, and the image quality adjuster executes the image quality adjustment process to adjust the first near distance range to be a range nearer than a range in which the supplemental light source is capable of illuminating a subject with the quantity of light, based on at least the quantity of light.

3. A computer program product for causing a computer to perform image processing using image data generated by an image generation device, and image generation record information associated with the image data that includes light emission information of a supplemental light source at a time of generation of the image data and information relating to a distance between a subject of the image data and the image generation device of the image data at the time of generation of the image data, comprising:

a computer readable storage medium; and a computer program stored on the computer readable storage medium, the computer program including:

a first program for causing a computer to decide, based on the light emission information for the supplemental light source included in the image generation record information, whether to execute an image quality adjustment process; and a second program for causing the computer, if a positive decision is made, to execute the image quality adjustment process to adjust the image data so as to reduce a maximum luminance value which is a largest possible luminance value the image data may have, wherein the first program for causing the computer to decide whether to execute the image quality adjustment process includes causing the computer to decide, based on the light emission information of the supplemental light source included in the image generation record information, whether illumination was provided by the supplemental light source at the time of generation of the image data, the second program for causing the computer to execute the image quality adjustment process includes causing the computer to execute the image quality adjustment process if a judgment is made that (a) illumination was provided by the supplemental light source at the time of generation of the image data, the second program for causing the computer to execute the image quality adjustment process includes causing the computer to execute the image quality adjustment process, or reduce a magnitude of luminance value adjustment in the image quality adjustment process, irrespective of a positive or negative result of the judgment (a), if a judgment is made that (b) the distance from the subject is not within a first near distance range, the image generation record information further includes information relating to quantity of light of the supplemental light source at the time of generation of the image data, and the second program for causing the computer to execute the image quality adjustment process includes causing the computer to adjust the first near distance range to be a range nearer than a range in which the supplemental light source is capable of illuminating a subject with the quantity of light, based on at least the quantity of light.

* * * * *